US011550083B2

(12) United States Patent
Calafiore

(10) Patent No.: US 11,550,083 B2
(45) Date of Patent: Jan. 10, 2023

(54) TECHNIQUES FOR MANUFACTURING SLANTED STRUCTURES

(71) Applicant: Meta Platforms Technologies, LLC, Menlo Park, CA (US)

(72) Inventor: Giuseppe Calafiore, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 80 days.

(21) Appl. No.: 16/909,573

(22) Filed: Jun. 23, 2020

(65) Prior Publication Data

US 2020/0408970 A1 Dec. 31, 2020

Related U.S. Application Data

(60) Provisional application No. 62/867,071, filed on Jun. 26, 2019.

(51) Int. Cl.
| | |
|---|---|
| *G02B 5/18* | (2006.01) |
| *F21V 8/00* | (2006.01) |
| *G02B 27/01* | (2006.01) |

(52) U.S. Cl.
CPC ............ *G02B 5/18* (2013.01); *G02B 5/1857* (2013.01); *G02B 6/0016* (2013.01); *G02B 6/0038* (2013.01); *G02B 27/0172* (2013.01); *G02B 2027/0118* (2013.01); *G02B 2027/0123* (2013.01); *G02B 2027/0178* (2013.01)

(58) Field of Classification Search
None
See application file for complete search history.

(56) References Cited

U.S. PATENT DOCUMENTS

| | | |
|---|---|---|
| 6,587,272 B2 | 7/2003 | Nakai |
| 8,532,450 B1 | 9/2013 | Wang et al. |
| 9,519,089 B1 | 12/2016 | Brown et al. |

(Continued)

FOREIGN PATENT DOCUMENTS

| | | |
|---|---|---|
| CN | 106662684 A | 5/2017 |
| CN | 112334290 A | 2/2021 |

(Continued)

OTHER PUBLICATIONS

U.S. Office Action dated May 9, 2019 in U.S. Appl. No. 16/036,722.

(Continued)

*Primary Examiner* — Darryl J Collins
*Assistant Examiner* — Tamara Y. Washington
(74) *Attorney, Agent, or Firm* — Weaver Austin Villeneuve & Sampson LLP

(57) ABSTRACT

A surface-relief grating comprises a plurality of grating ridges including a first material, and a layer of a second material conformally deposited on surfaces of the plurality of grating ridges. A first region of the surface-relief grating is characterized by a first grating depth and a first duty cycle greater than a first threshold value. A second region of the surface-relief grating is characterized by a second grating depth and a second duty cycle lower than a second threshold value that is lower than the first threshold value. A difference between the first grating depth and the second grating depth is less than 20% of the second grating depth.

15 Claims, 20 Drawing Sheets

(56) References Cited

U.S. PATENT DOCUMENTS

| | | |
|---|---|---|
| 10,185,092 B1 | 1/2019 | Bian et al. |
| 10,649,119 B2 | 5/2020 | Monhanty et al. |
| 10,795,082 B1 | 10/2020 | Jacob et al. |
| 11,249,230 B2 | 2/2022 | Mohanty et al. |
| 2002/0122255 A1 | 9/2002 | Ogusu et al. |
| 2003/0034329 A1 | 2/2003 | Chou |
| 2005/0211547 A1 | 9/2005 | Hanawa et al. |
| 2006/0045987 A1 | 3/2006 | Chandler et al. |
| 2007/0158872 A1 | 7/2007 | Jeong et al. |
| 2009/0011367 A1 | 1/2009 | Omatsu et al. |
| 2010/0120247 A1 | 5/2010 | Park |
| 2010/0230864 A1 | 9/2010 | Park et al. |
| 2013/0127090 A1 | 5/2013 | Yamada et al. |
| 2013/0192758 A1 | 8/2013 | Toth et al. |
| 2014/0234466 A1 | 8/2014 | Gao et al. |
| 2015/0125976 A1 | 5/2015 | Wang |
| 2015/0279686 A1 | 10/2015 | Kuo et al. |
| 2016/0033784 A1 | 2/2016 | Levola et al. |
| 2016/0035539 A1 | 2/2016 | Sainiemi et al. |
| 2016/0042971 A1 | 2/2016 | Mohanty |
| 2016/0254369 A1 | 9/2016 | Yi et al. |
| 2016/0274281 A1 | 9/2016 | Lutolf et al. |
| 2016/0308020 A1 | 10/2016 | Sreenivasan et al. |
| 2017/0059879 A1 | 3/2017 | Vallius |
| 2017/0311430 A1 | 10/2017 | Liang et al. |
| 2019/0056591 A1 | 2/2019 | Tervo et al. |
| 2019/0227316 A1* | 7/2019 | Lee ................ G02B 5/1857 |
| 2019/0369321 A1 | 12/2019 | Young et al. |
| 2020/0018875 A1 | 1/2020 | Monhanty et al. |
| 2020/0192108 A1 | 6/2020 | Godet et al. |
| 2020/0264353 A1 | 8/2020 | Monhanty et al. |
| 2020/0409151 A1 | 12/2020 | Calafiore |
| 2021/0180183 A1 | 6/2021 | Guo et al. |

FOREIGN PATENT DOCUMENTS

| | | |
|---|---|---|
| EP | 1183684 B1 | 6/2008 |
| EP | 2833168 A1 | 2/2015 |
| EP | 3823806 A1 | 5/2021 |
| JP | 2011034648 A | 2/2011 |
| JP | 2013251320 A | 12/2013 |
| WO | 2007031991 A2 | 3/2007 |
| WO | WO-2010047813 A1 | 4/2010 |
| WO | WO-2018126760 A1 | 7/2018 |
| WO | 2018220269 A1 | 12/2018 |
| WO | 2020018079 A1 | 1/2020 |
| WO | 2020264198 A1 | 12/2020 |

OTHER PUBLICATIONS

U.S. Final Office Action dated Oct. 10, 2019 in U.S. Appl. No. 16/036,722.

U.S. Advisory Action dated Dec. 18, 2019 in U.S. Appl. No. 16/036,722.

Notice of Allowance dated Jan. 8, 2020 in U.S. Appl. No. 16/036,722.

International Application No. PCT/US2018/042488, International Search Report and Written Opinion, dated Apr. 10, 2019, 11 pages.

International Application No. PCT/US2018/058272, International Search Report and Written Opinion, dated Mar. 11, 2019, 14 pages.

International Application No. PCT/US2018/036515, International Search Report and Written Opinion, dated Sep. 27, 2018, 15 pages.

International Application No. PCT/US2020/39671, International Search Report and Written Opinion, Nov. 5, 2020, 16 pages.

International Application No. PCT/US2020/39671, Partial International Search Report and Written Opinion, Sep. 9, 2020, 11 pages.

Donnelly, et al., "Plasma Etching: Yesterday, Today, and Tomorrow", J. Vac. Sci. Technol. vol. A31, 2013, pp. 050825-1 to 050825-48.

Miller et al., "Design and Fabrication of Binary Slanted Surface-Relief Gratings for a Planar Optical Interconnection," Applied Optics, vol. 36, No. 23, Aug. 10, 1997, 12 pages.

Park et al., "Sub-22 nm silicon template nanofabrication y advanced spacer patterning technique for NIL applications", Proc. of SPIE vol. 8680, 2013, pp. 86802B-1 to 86802B-8.

Zhou, Nanoimprint Lithography: An Enabling Process for Nanofabrication, Chapter 4, Spring-Verlag, Berlin, 2013, pp. 87-88.

Extended European Search Report for European Application No. 18926712.3, dated Aug. 3, 2021, 9 Pages.

International Preliminary Report on Patentability for International Application No. PCT/US2018/042488, dated Jan. 28, 2021, 8 Pages.

Non-Final Office Action dated Jun. 14, 2021 for U.S. Appl. No. 16/869,369, filed May 7, 2020, 10 Pages.

Notice of Allowance dated Oct. 6, 2021 for U.S. Appl. No. 16/869,369, filed May 7, 2020, 10 Pages.

Non-Final Office Action dated Nov. 16, 2021 for U.S. Appl. No. 16/909,568, filed Jun. 23, 2020, 9 pages.

Notice of Allowance dated Mar. 16, 2022 for U.S. Appl. No. 16/909,568, filed Jun. 23, 2020, 11 pages.

Notice of Allowance dated Apr. 22, 2022 for U.S. Appl. No. 16/909,568, filed Jun. 23, 2020, 02 pages.

Office Action dated Jan. 19, 2022 for Chinese Application No. 201880094597.7, filed Jul. 17, 2018, 15 pages.

* cited by examiner

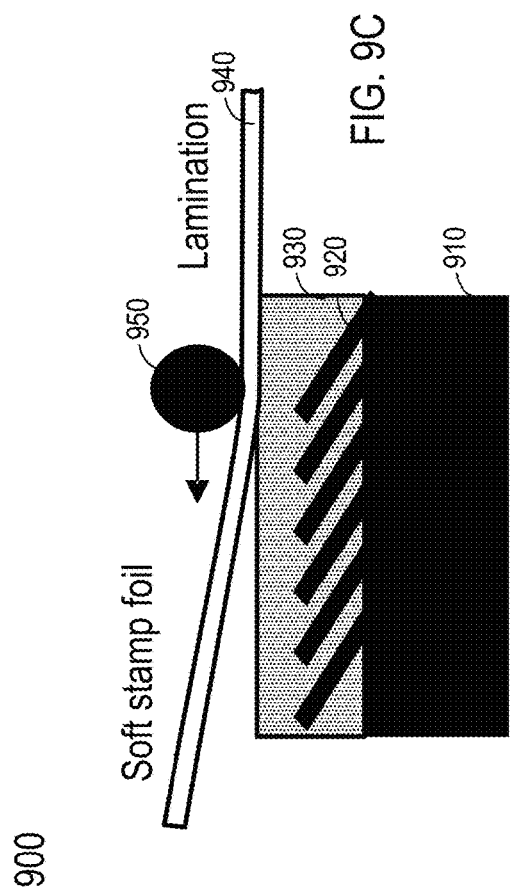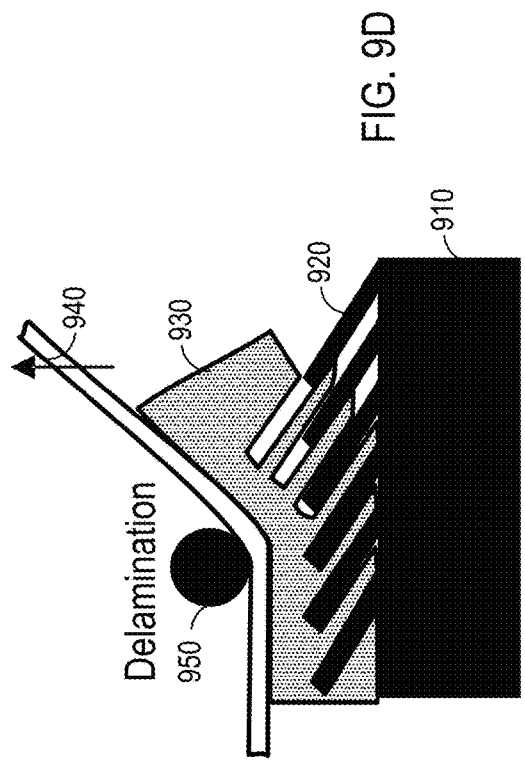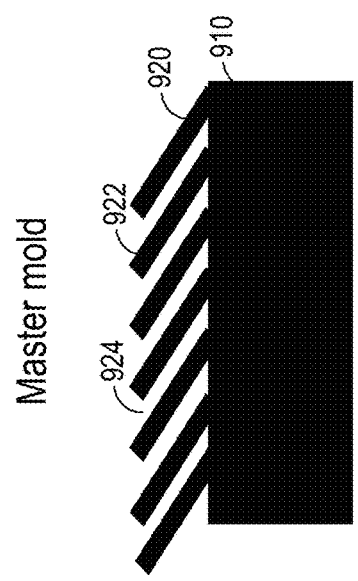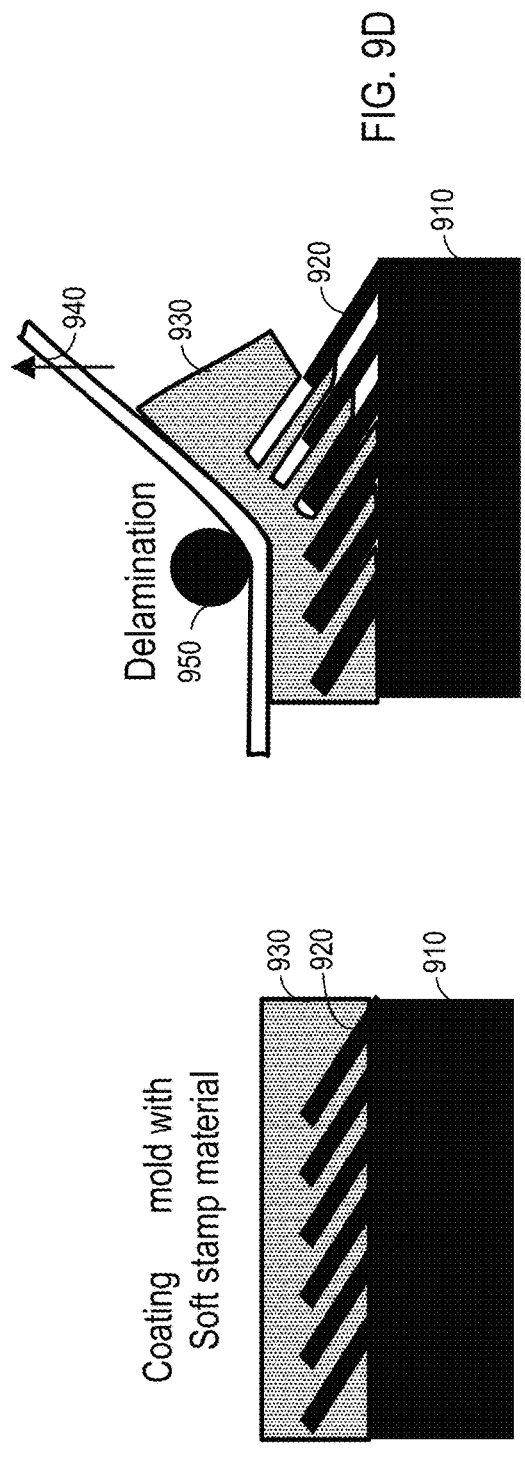

TECHNIQUES FOR MANUFACTURING SLANTED STRUCTURES

CROSS-REFERENCE TO RELATED APPLICATION

This patent application claims benefit of and priority to U.S. Provisional Patent Application Ser. No. 62/867,071, filed Jun. 26, 2019, entitled "Techniques For Manufacturing Slanted Structures," the disclosure of which is hereby incorporated by reference in its entirety for all purposes. This patent application is related to and is filed concurrently with U.S. patent application Ser. No. 16/909,568, filed Jun. 23, 2020, and entitled "Techniques For Controlling Effective Refractive Index of Gratings", the entire disclosure of which is hereby incorporated by reference into this application for all purposes.

BACKGROUND

An artificial reality system, such as a head-mounted display (HMD) or heads-up display (HUD) system, generally includes a display configured to present artificial images that depict objects in a virtual environment. The display may show virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

One example of an optical see-through AR system may use a waveguide-based optical display, where light of projected images may be coupled into a waveguide (e.g., a substrate), propagate within the waveguide, and be coupled out of the waveguide at different locations. In some implementations, the light of the projected images may be coupled into or out of the waveguide using a diffractive optical element, such as a straight or slanted surface-relief grating. To achieve desired performance, such as a wide field of view, wide optical bandwidth, high efficiency, low artifact, and desired angular selectivity, deep surface-relief gratings with large slanted angles, high refractive index modulation, and large grating duty cycles may be used, where the duty cycle is the ratio between the width of a grating ridge and the grating period. However, fabricating such deep surface-relief gratings at a high fabrication speed and high yield remains a challenging task.

SUMMARY

This disclosure relates generally to techniques for fabricating surface-relief structures, such as straight or slanted surface-relief gratings. More specifically, and without limitation, disclosed herein are techniques for fabricating deep structures having a wide range of duty cycles (in particular, large duty cycles) and/or desired refractive index modulation in various inorganic or organic materials (e.g., metal alloy, silicon dioxide, silicon nitride, titanium dioxide, alumina, polymer), such as a slanted surface-relief grating used in a waveguide-based near-eye display system or a master mold for nanoimprinting the slanted surface-relief grating. Various inventive embodiments are described herein, including methods, systems, devices, and the like.

According to certain embodiments, a surface-relief grating may include a plurality of grating ridges including a first material, and a layer of a second material conformally deposited on the surfaces of the plurality of grating ridges. A first region of the surface-relief grating is characterized by a first grating depth and a first duty cycle greater than a first threshold value. A second region of the surface-relief grating is characterized by a second grating depth and a second duty cycle lower than a second threshold value that is lower than the first threshold value. A difference between the first grating depth and the second grating depth is less than 20% of the second grating depth.

In some embodiments of the surface-relief grating, the first threshold value is greater than 0.7 or greater than 0.8. In some embodiments, the second threshold value is lower than 0.5 or lower than 0.4. In some embodiments, the first threshold value is greater than 0.8 and the second threshold value is lower than 0.4. In some embodiments, a thickness of the layer of the second material is less than 20% of a period of the surface-relief grating. In some embodiments, the first region of the surface-relief grating is characterized by a slant angle greater than 30°. In some embodiments, the second grating depth is greater than 100 nm. In some embodiments, the first region of the surface-relief grating is characterized by a grating period less than 200 nm.

In some embodiments of the surface-relief grating, the first material may include at least one of metal alloy, silicon, amorphous silicon, $SiO_2$, $Si_3N_4$, titanium oxide, alumina, TaOx, HfOx, SiC, SiOxNy, spin-on carbon (SOC), amorphous carbon, diamond-like carbon (DLC), or an organic material. In some embodiments, the second material may include at least one of $SiO_2$, $Al_2O_3$, $TiO_2$, $HfO_2$, ZrO, $ZnO_2$, $Si_3N_4$, or an organic material. In some embodiments, the second material has a higher refractive index than the first material. In some embodiments, the layer of the second material is characterized by a variation in thickness less than 10% of an average thickness of the layer of the second material. In some embodiments, the layer of the second material is conformally deposited on the surfaces of the plurality of grating ridges by atomic layer deposition or plasma-enhanced chemical vapor deposition (PECVD).

According to certain embodiments, a method may include imprinting or etching, in a first material layer, a surface-relief structure characterized by a minimum duty cycle and a maximum duty cycle less than a first threshold value. A first region of the surface-relief structure has the minimum duty cycle and a first depth. A second region of the surface-relief structure has the maximum duty cycle and a second depth. A difference between the first depth and the second depth is less than 20% of the first depth. The method may further include depositing, conformally on surfaces of the surface-relief structure, a layer of a second material to form a surface-relief device.

In some embodiments, the first threshold value is lower than 0.7. In some embodiments, a maximum duty cycle of the surface-relief device is greater than 0.75. In some embodiments, the layer of the second material is conformally deposited on the surfaces of the surface-relief structure by atomic layer deposition (ALD) or PECVD. In some embodiments, the maximum duty cycle of the surface-relief device is greater than 0.7, a slant angle of the second region of the surface-relief structure is greater than 30°, and the first depth is greater than 100 nm.

According to certain embodiments, a surface-relief structure may include a surface-relief grating including a first material characterized by a first refractive index, a first layer of a second material characterized by a second refractive index and conformally deposited on surfaces of the surface-relief grating, and a second layer of a third material conformally deposited on the first layer, the third material characterized by a third refractive index. One of the second refractive index and the third refractive index is lower or greater than the first refractive index, and an effective refractive index of a combination of the first layer and the second layer is equal to the first refractive index. In some embodiments, the surface-relief grating may include a grating imprinted in an organic material.

In some embodiments, a thickness of the first layer and a thickness of the second layer may be selected based on the first refractive index, the second refractive index, and the third refractive index. In some embodiments, the surface-relief structure may also include a third layer of the second material conformally deposited on the second layer, and a fourth layer of the third material conformally deposited on the third layer. In some embodiments, the surface-relief structure may also include an overcoat layer on the second layer, the overcoat layer filling gaps in the surface-relief grating and characterized by a fourth refractive index different from the first refractive index.

According to certain embodiments, a surface-relief structure may include a surface-relief grating including a first material characterized by a first refractive index, a first layer of a second material conformally deposited on surfaces of the surface-relief grating and characterized by a second refractive index greater than the first refractive index, and a second layer of a third material conformally deposited on the first layer and characterized by a third refractive index greater than the second refractive index. In some embodiments, the surface-relief grating may include a grating imprinted in an organic material. In some embodiments, the surface-relief structure may also include an overcoat layer on the second layer, the overcoat layer filling gaps in the surface-relief grating and characterized by a fourth refractive index greater than or equal to the third refractive index.

According to certain embodiments, a surface-relief structure may include a surface-relief grating including a first organic material characterized by a first refractive index, a first layer of a second material conformally deposited on surfaces of the surface-relief grating and characterized by a second refractive index lower than the first refractive index, and a second layer of a third material conformally deposited on the first layer, the third material characterized by a third refractive index lower than the second refractive index. In some embodiments, the surface-relief structure may also include an overcoat layer on the second layer, the overcoat layer filling gaps in the surface-relief grating and characterized by a fourth refractive index lower than or equal to the third refractive index.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 8A shows a molding process. FIG. 8B shows a demolding process.

FIGS. 9A-9D illustrate an example process for fabricating a soft stamp used to make a slanted surface-relief grating according to certain embodiments. FIG. 9A shows a master mold. FIG. 9B illustrates the master mold coated with a soft stamp material layer. FIG. 9C illustrates a lamination process for laminating a soft stamp foil onto the soft stamp material layer. FIG. 9D illustrates a delamination process, where the soft stamp including the soft stamp foil and the attached soft stamp material layer is detached from the master mold.

FIG. 10A shows a waveguide coated with an imprint resin layer. FIG. 10B shows the lamination of the soft stamp onto the imprint resin layer. FIG. 10C shows the delamination of the soft stamp from the imprint resin layer. FIG. 10D shows an example of an imprinted slanted grating formed on the waveguide.

FIG. 7C illustrates an example of a stack of coating layers matching the refractive index of an imprinted surface-relief grating according to certain embodiments.

Figure 1:
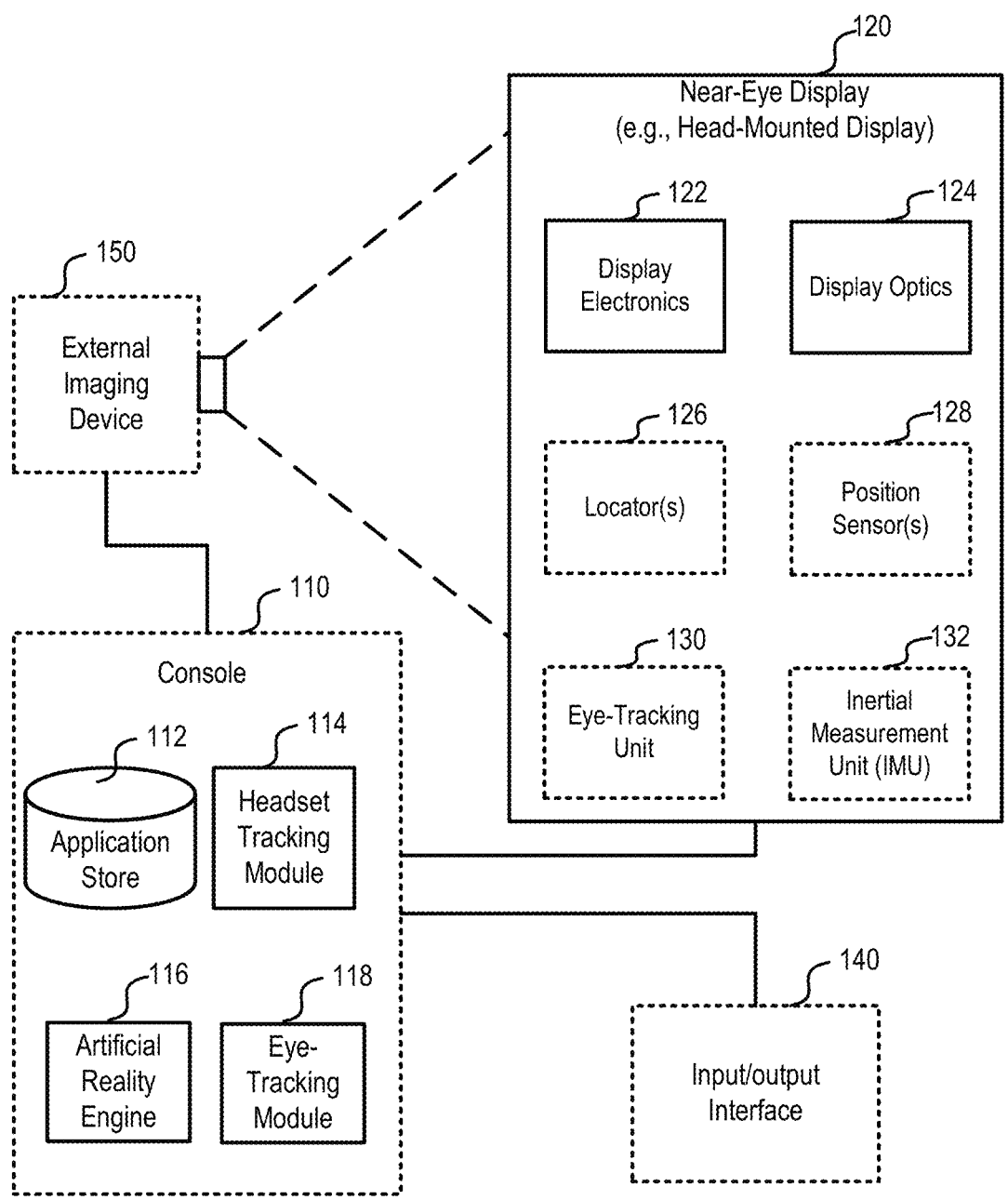
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to surface-relief structures, such as straight or slanted surface-relief gratings. More specifically, and without limitation, this disclosure relates to techniques for manufacturing surface-relief structures, such as straight or slanted surface-relief gratings used in a waveguide-based near-eye display system. Techniques disclosed herein can be used to fabricate straight or slanted surface-relief gratings with wide ranges of grating duty cycles (in particular, large duty cycles), large refractive index modulation, small periods, small critical dimensions, high depths, and/or large slanted angles at a high fabrication speed and accuracy. The surface-relief gratings can be used as, for example, waveguide couplers in waveguide-based displays to improve the field of view, increase the brightness or contrast ratio of displayed images, increase power efficiency, and reduce display artifacts (e.g., rainbow artifacts) of the waveguide-based displays.

Gratings may be used in a waveguide-based near-eye display system for coupling light into or out of a waveguide or for eye tracking. In some waveguide-based near-eye display systems, the grating coupler may include a straight or slanted deep surface-relief grating. In order to improve the optical performance of the waveguide-based near-eye display system, the grating coupler may need to have different diffraction characteristics at different regions of the grating. Thus, the grating period, the duty cycle, the grating depth, and/or the slant angle of the grating may need to vary across the grating. For example, slanted surface-relief gratings with wide ranges of duty cycles, such as from about 10% to about 90%, can be very useful for optimizing the diffraction efficiency and/or the angular and/or spectral response of the grating. In addition, in some applications, to selectively couple display light and ambient light into and out of the waveguide and into user's eyes, improve field of view, increase brightness and efficiency, reduce display artifacts (e.g., rainbow artifacts), and/or improve other performances of a waveguide-based near-eye display system, a slanted surface-relief grating having a wide range of grating duty cycles (e.g., from about 0.3 to about 0.9), large slant angles (e.g., greater than 30°, 45°, 60°, or larger), small grating periods (e.g., less than a few microns or less than a micron), high depths (e.g., greater than 100 nm), and a certain refractive index modulation (e.g., $\Delta n$) profile may be desired.

However, it may be challenging to fabricate such a slanted surface-relief grating with a wide range of duty cycles (in particular, large duty cycles) and desired depths at a high production speed with a high fabrication accuracy and yield using current manufacturing techniques, such as nanoimprint techniques or etching techniques. For example, it may be difficult to fabricate a deep slanted structure with large duty cycles using imprint techniques without cracking or breaking at least some grating ridges of the mold, stamp, or the imprinted deep slanted structure. To etch a deep surface-relief structure having a wide range of duty cycles using, for example, reactive ion etching (RIE), at least some areas of the surface-relief structure where the desired duty cycles are large may have low etch rates and thus may not have the desired depths due to the different etch rates at regions with different duty cycles and/or periods (or pitches).

According to certain embodiments, to fabricate a nanostructure with a duty cycle range that includes large duty cycles (e.g., about 0.5 to about 0.9), an initial nanostructure (e.g., a master mold or a grating) with reduced duty cycles (e.g., about 0.3 to about 0.7) may be imprinted or etched first, where the mask for the etching and/or the stamp for the nanoimprint may be adjusted to have duty cycles lower than the desired duty cycles of the nanostructure. One or more layers of materials may then be conformally deposited on the surfaces of the initial nanostructure to increase the duty cycles of the nanostructure. For example, one or more uniform layers of oxide (e.g., $SiO_2$, $Al_2O_3$, $TiO_2$, $HfO_2$, $ZrO_2$, $ZnO_2$, $Si_3N_4$, etc.) may be conformally deposited on the surfaces of the initial nanostructure using techniques such as atomic layer deposition (ALD) to increase the duty cycles of the nanostructure. In some embodiments, the materials of the deposited layers may have refractive indices close to or higher than the refractive index of the imprinted or etched initial nanostructure.

In many implementations, the refractive index of the deposited material may not match the refractive index of the imprinted nanostructure because it may be difficult to find a material that can be deposited using ALD techniques and also has a refractive index matching the refractive index of the polymer material of the imprinted nanostructure. According to certain embodiments, two or more layers of different materials may be deposited on the imprinted nanostructure to increase the duty cycle of the nanostructure and also match the refractive index. For example, a first thin ALD layer may include a first material having a refractive index lower than the refractive index of the imprinted nanostructure, and a second thin ALD layer may include a second material having a refractive index greater than the refractive index of the imprinted nanostructure. The thicknesses of the first thin ALD layer and the second thin ALD layer may be selected such that the effective index of a combination of the two thin ALD layers may more precisely match the refractive index of the material of the imprinted nanostructure (e.g., polymers). In some embodiments, the two or more layers of different materials may include two or more sets of layers, where each set of layers may include two or more layers of different materials.

Additionally or alternatively, the surface-relief structure may be imprinted or etched in a resin layer or other organic layer that may have a relatively low refractive index (e.g., resin or polymer with high refractive index nanoparticles, such as $TiO_2$, GaP, $HfO_2$, GaAs, etc.). However, in many cases, it may be desirable that the surface-relief structure has a high refractive index in order to achieve a higher refractive index modulation and a desired performance. According to certain embodiments, a nanostructure may be imprinted or etched in a low refractive index material layer (e.g., resin or polymer layer), and one or more sub-wavelength layers of materials having a higher refractive index, such as $SiO_2$, $Al_2O_3$, $TiO_2$, $HfO_2$, $ZrO_2$, $ZnO_2$, $Si_3N_4$, and the like, may be conformally deposited on the surface of the nanostructure to increase the effective refractive index of the nanostructure.

In some embodiments, the ALD layers deposited on the imprinted nanostructure may have refractive indices lower than the refractive index of the imprinted nanostructure to reduce the effective refractive index of the nanostructure. As such, when an overcoat layer having a higher refractive index is formed on the nanostructure, the refractive index modulation (e.g., Δn) may be increased. In some embodiments, the ALD layers deposited on the imprinted nanostructure may have gradually decreasing refractive indices such that the refractive index modulation may be apodized to, for example, reduce the side lobes and other artifacts in the diffracted light beam.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140 that may each be coupled to an optional console 110.

While FIG. 1 shows example artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audios, or some combination thereof. In some embodiments, audios may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form factor, including a pair of glasses. Some embodiments of near-eye display 120 are further described below with respect to, for example, FIGS. 2-4 and 18. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of these elements or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional (2D) panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, for example, determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received or when console 110 has performed a requested action and communicates instructions to input/output interface 140.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or some combination thereof, to predict a future location of near-eye display 120. Headset tracking module 114 may provide the estimated or predicted future position of near-eye display 120 to artificial reality engine 116.

Headset tracking module 114 may calibrate the artificial reality system environment 100 using one or more calibration parameters, and may adjust one or more calibration parameters to reduce errors in determining the position of near-eye display 120. For example, headset tracking module 114 may adjust the focus of external imaging device 150 to obtain a more accurate position for observed locators on near-eye display 120. Moreover, calibration performed by headset tracking module 114 may also account for information received from IMU 132. Additionally, if tracking of near-eye display 120 is lost (e.g., external imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display 120, acceleration information of near-eye display 120, velocity information of near-eye display 120, predicted future positions of near-eye display 120, or some combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light. In some embodiments, at least some of the functions of eye-tracking module 118 may be performed by eye-tracking unit 130.

Figure 2:
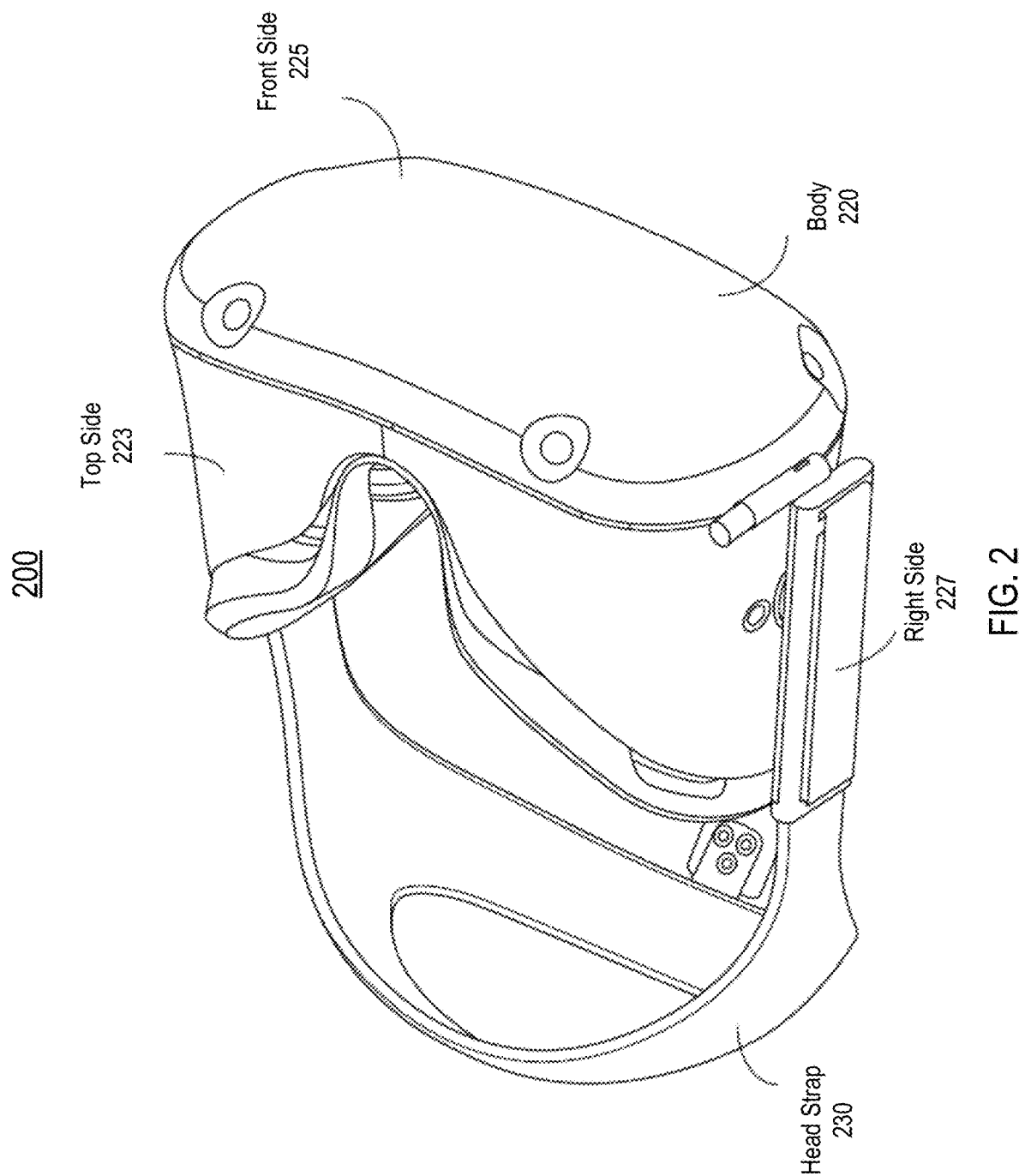
FIG. 2 is a perspective view of an example of a near-eye display in the form of a head-mounted display device for implementing some of the examples disclosed herein.

FIG. 2 is a perspective view of an example of a near-eye display in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a top side 223, a front side 225, and a right side 227 of body 220 in the perspective view. Head strap 230 may have an adjustable or extendible length. There may be sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., 2D or 3D images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
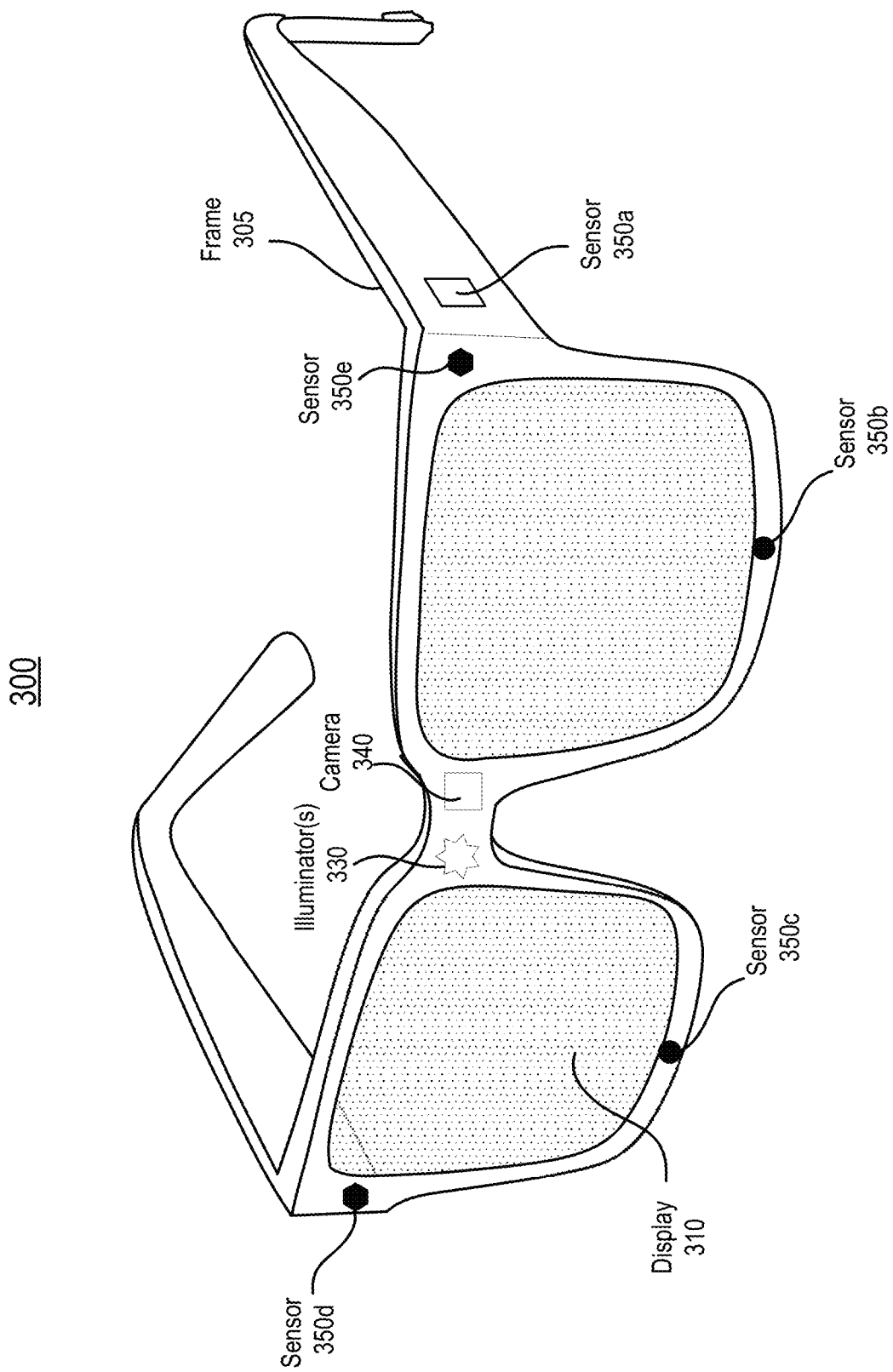
FIG. 3 is a perspective view of a simplified example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
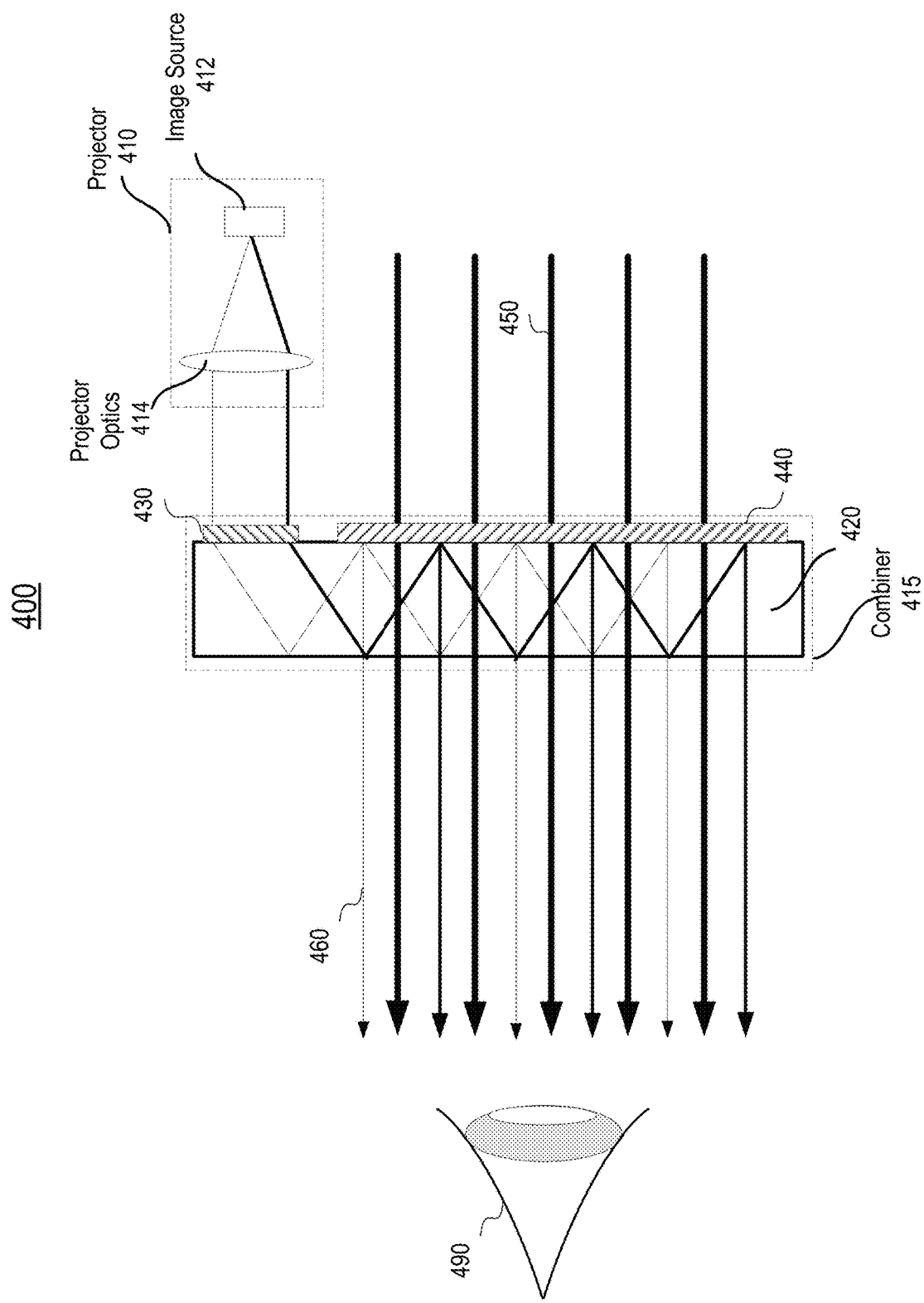
FIG. 4 illustrates an example of an optical see-through augmented reality system using a waveguide display according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a diffractive optical elements (DOE) (e.g., a surface-relief grating), or a refractive coupler (e.g., a wedge or a prism). Input coupler 430 may have a coupling efficiency of greater than 30%, 50%, 75%, 90%, or higher for visible light. As used herein, visible light may refer to light with a wavelength between about 380 nm to about 750 nm. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light. A material may be "transparent" to a light beam if the light beam can pass through the material with a high transmission rate, such as larger than 50%, 40%, 75%, 80%, 90%, 95%, or higher, where a small portion of the light beam (e.g., less than 50%, 40%, 25%, 20%, 10%, 5%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As with input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450, such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

Figure 5:
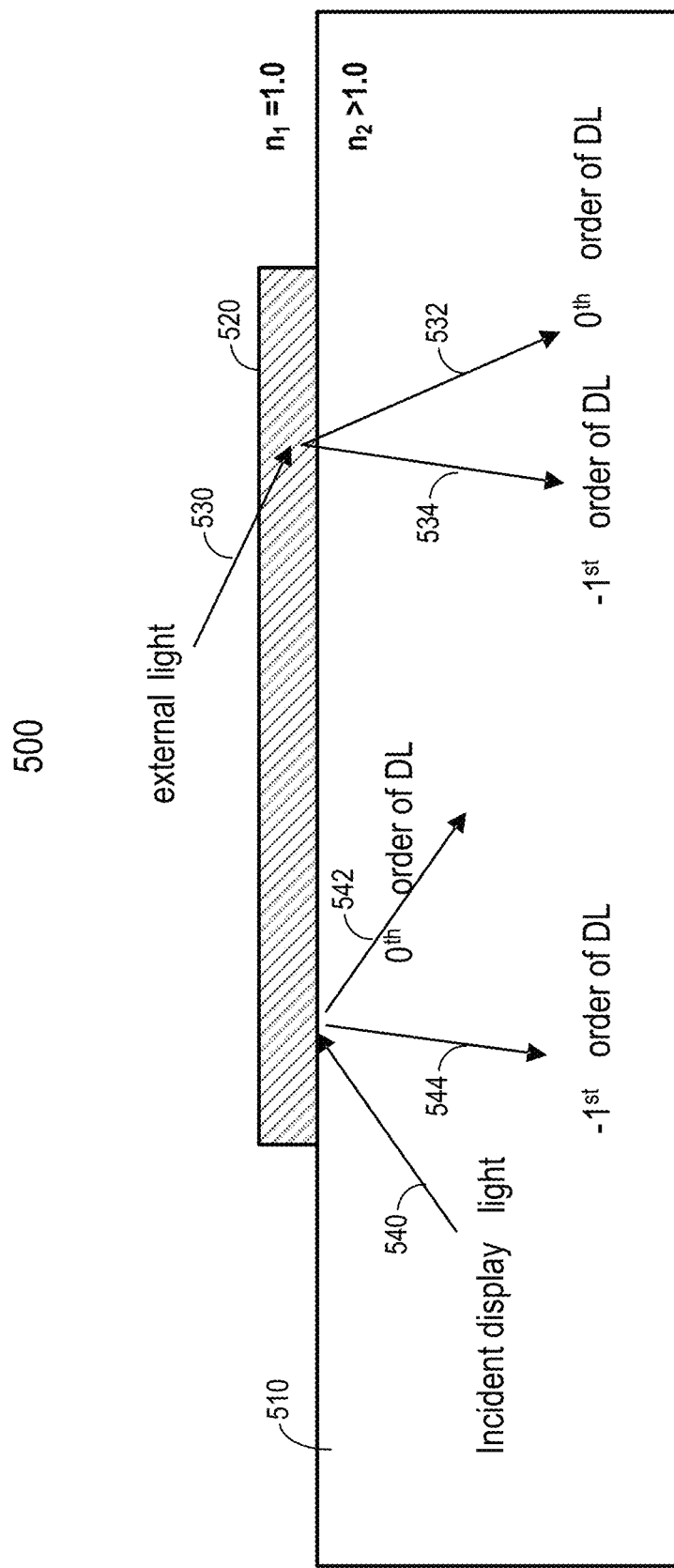
FIG. 5 illustrates propagations of display light and external light in an example waveguide display.

FIG. 5 illustrates propagations of incident display light 540 and external light 530 in an example of a waveguide display 500 including a waveguide 510 and a grating coupler 520. Waveguide display 500 may include, for example, combiner 415 of FIG. 4. Waveguide 510 may be a flat or curved transparent substrate with a refractive index $n_2$ greater than the free space refractive index $n_1$ (i.e., 1.0). Grating coupler 520 may include, for example, a Bragg grating or a surface-relief grating.

Incident display light 540 may be coupled into waveguide 510 by, for example, input coupler 430 of FIG. 4 or other couplers (e.g., a prism or slanted surface) described above. Incident display light 540 may propagate within waveguide 510 through, for example, total internal reflection. When incident display light 540 reaches grating coupler 520, incident display light 540 may be diffracted by grating coupler 520 into, for example, a $0^{th}$ order diffraction (i.e., reflection) light 542 and a −1st order diffraction light 544. The 0$^{th}$ order diffraction may continue to propagate within waveguide 510, and may be reflected by the bottom surface of waveguide 510 towards grating coupler 520 at a different location. The −1$^{st}$ order diffraction light 544 may be coupled (e.g., refracted) out of waveguide 510 towards the user's eye, because a total internal reflection condition may not be met at the bottom surface of waveguide 510 due to the diffraction angle of the −1$^{st}$ order diffraction light 544.

External light 530 may also be diffracted by grating coupler 520 into, for example, a 0$^{th}$ order diffraction light 532 or a −1st order diffraction light 534. The 0$^{th}$ order diffraction light 532 or the −1st order diffraction light 534 may be refracted out of waveguide 510 towards the user's eye. Thus, grating coupler 520 may act as an input coupler for coupling external light 530 into waveguide 510, and may also act as an output coupler for coupling incident display light 540 out of waveguide 510. As such, grating coupler 520 may act as a combiner for combining external light 530 and incident display light 540 and send the combined light to the user's eye.

In order to diffract light in a desired direction towards the user's eye and to achieve a desired diffraction efficiency for certain diffraction orders, grating coupler 520 may include a blazed or slanted grating, such as a slanted Bragg grating or surface-relief grating, where the grating ridges and grooves may be tilted relative to the surface normal of grating coupler 520 or waveguide 510.

Figure 6:
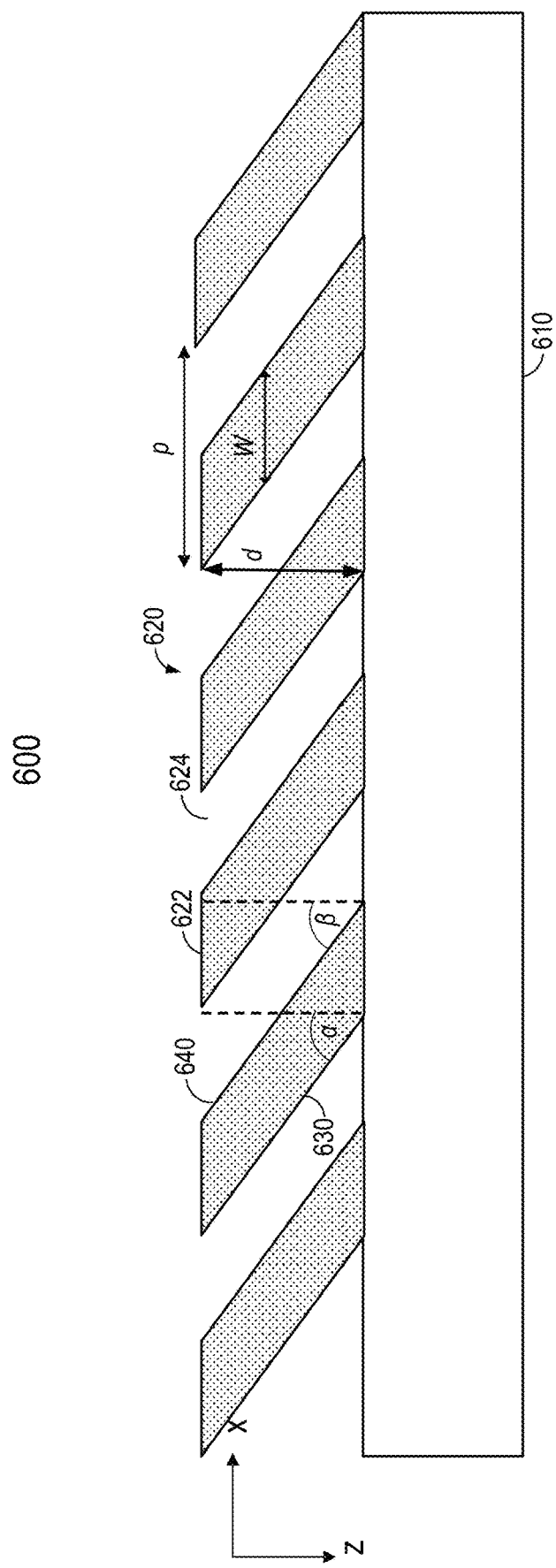
FIG. 6 illustrates an example of a slanted grating coupler in a waveguide display according to certain embodiments.

FIG. 6 illustrates an example slanted grating 620 in an example waveguide display 600 according to certain embodiments. Slanted grating 620 may be an example of output couplers 440 or grating coupler 520. Waveguide display 600 may include slanted grating 620 on a waveguide 610, such as substrate 420 or waveguide 510. Slanted grating 620 may act as a grating coupler for coupling light into or out of waveguide 610. In some embodiments, slanted grating 620 may include a periodic structure with a period p. For example, slanted grating 620 may include a plurality of ridges 622 and grooves 624 between ridges 622. Each period of slanted grating 620 may include a ridge 622 and a groove 624, which may be an air gap or a region filled with a material with a refractive index $n_{g2}$. The ratio between the width w of a ridge 622 and the grating period p may be referred to as duty cycle. Slanted grating 620 may have a duty cycle ranging, for example, from about 10% to about 90% or greater. In some embodiments, the duty cycle may vary from period to period. In some embodiments, the period p of the slanted grating may vary from one area to another on slanted grating 620, or may vary from one period to another (i.e., chirped) on slanted grating 620.

Ridges 622 may be made of a material with a refractive index of $n_{g1}$, such as silicon containing materials (e.g., SiO$_2$, Si$_3$N$_4$, SiC, SiO$_x$N$_y$, or amorphous silicon), organic materials (e.g., spin on carbon (SOC) or amorphous carbon layer (ACL) or diamond like carbon (DLC)), or inorganic metal oxide layers (e.g., TiO$_x$, AlO$_x$, TaO$_x$, HfO$_x$, etc.). Each ridge 622 may include a leading edge 630 with a slant angel α and a trailing edge 640 with a slant angle β. In some embodiments, leading edge 630 and training edge 640 of each ridge 622 may be parallel to each other. In other words, slant angle α is approximately equal to slant angle β. In some embodiments, slant angle α may be different from slant angle β In some embodiments, slant angle α may be approximately equal to slant angle β. For example, the difference between slant angle α and slant angle β may be less than 20%, 10%, 5%, 1%, or less. In some embodiments, slant angle α and slant angle β may range from, for example, about 30° or less to about 70% or more.

In some implementations, grooves 624 between the ridges 622 may be over-coated or filled with a material having a refractive index $n_{g2}$ higher or lower than the refractive index of the material of ridges 622. For example, in some embodiments, a high refractive index material, such as Hafnia, Titania, Tantalum oxide, Tungsten oxide, Zirconium oxide, Gallium sulfide, Gallium nitride, Gallium phosphide, silicon, and a high refractive index polymer, may be used to fill grooves 624. In some embodiments, a low refractive index material, such as silicon oxide, alumina, porous silica, or fluorinated low index monomer (or polymer), may be used to fill grooves 624. As a result, the difference between the refractive index of the ridges and the refractive index of the grooves may be greater than 0.1, 0.2, 0.3, 0.5, 1.0, or higher.

The slanted gratings described above and other surface-relief gratings (e.g., gratings used for eye-tracking) may be fabricated using many different nanofabrication techniques. The nanofabrication techniques generally include a patterning process and a post-patterning (e.g., over-coating) process. The patterning process may be used to form slanted ridges of the slanted grating. There may be many different nanofabrication techniques for forming the slanted ridges. For example, in some implementations, the slanted grating may be fabricated using lithography techniques including slanted etching. In some implementations, the slanted grating may be fabricated using nanoimprint lithography (NIL) molding techniques, where a master mold including slanted structures may be fabricated using, for example, slanted etching techniques, and may then be used to mold slanted gratings or different generations of soft stamps for nanoimprinting. The post-patterning process may be used to over-coat the slanted ridges and/or to fill the gaps between the slanted ridges with a material having a different refractive index than the slanted ridges. The post-patterning process may be independent from the patterning process. Thus, a same post-patterning process may be used on slanted gratings fabricated using any pattering technique.

Techniques and processes for fabricating slanted gratings described below are for illustration purposes only and are not intended to be limiting. A person skilled in the art would understand that various modifications may be made to the techniques described below. For example, in some implementations, some operations described below may be omitted. In some implementations, additional operations may be performed to fabricate the slanted grating. Techniques disclosed herein may also be used to fabricate other slanted structures on various materials.

Figure 7A:
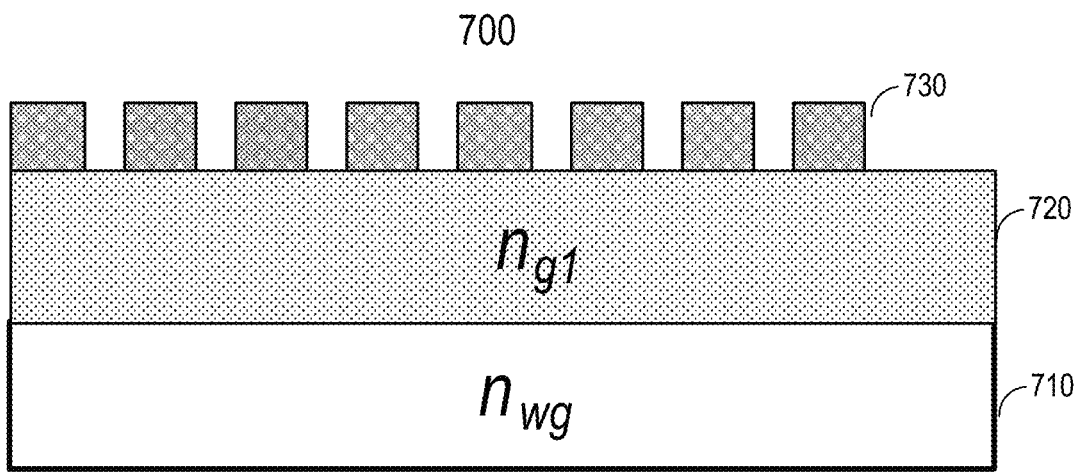
FIGS. 7A-7C illustrate an example of a process for fabricating a slanted surface-relief structure by slanted etching according to certain embodiments.
Figure 7B:
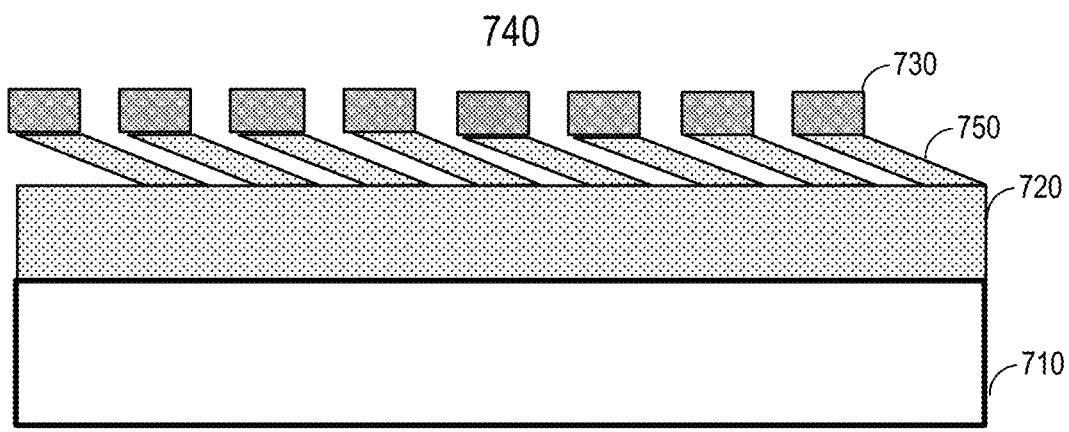
Figure 7C:
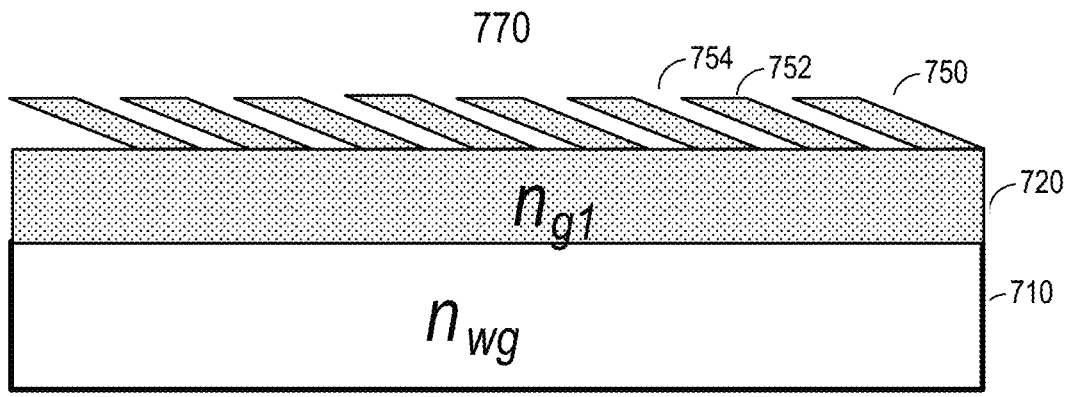

FIGS. 7A-7C illustrate an example of a process for fabricating a slanted surface-relief grating by slanted etching according to certain embodiments. FIG. 7A shows a structure 700 after a lithography process, such as a photolithography or electron beam lithography process. Structure 700 may include a substrate 710 that may be used as the waveguide of a waveguide display described above, such as a glass or quartz substrate. In some embodiments, structure 700 may also include a layer of grating material 720, such as Si$_3$N$_4$, SiO$_2$, titanium oxide, alumina, and the like. Substrate 710 may have a refractive index $n_{wg}$, and the layer of grating material 720 may have a refractive index $n_{g1}$. In some embodiments, the layer of grating material 720 may be a part of substrate 710. A mask layer 730 with a desired pattern may be formed on top of the layer of grating material 720. Mask layer 730 may include, for example, a photoresist material, a metal (e.g., copper, chrome, titanium, aluminum, or molybdenum), an intermetallic compound (e.g., MoSiON), or an organic material (e.g., polymer). Mask layer 730 may be referred to as a hard mask layer. Mask layer 730 may be formed by, for example, an optical projection (using a photomask) or electron beam lithography process, a nanoimprint lithography process, a multi-beam interference process, and the like.

FIG. 7B shows a structure 740 after a slanted etching process, such as a dry etching process (e.g., RIE, inductively coupled plasma (ICP) etching, deep silicon etching (DSE), IBE, or variations of IBE). The slanted etching process may include one or more sub-steps. The slanted etching may be performed by, for example, rotating structure 700 with respect to the direction of the etching beam based on the desired slant angle and etching the layer of grating material 720 by the etching beam. After the etching, a slanted grating 750 may be formed in the layer of grating material 720.

FIG. 7C shows a structure 770 after mask layer 730 is removed. Structure 770 may include substrate 710, the layer of grating material 720, and slanted grating 750. Slanted grating 750 may include a plurality of ridges 752 and grooves 754. Techniques such as plasma or wet etching may be used to strip mask layer 730 with appropriate chemistry. In some implementations, mask layer 730 may not be removed and may be used as part of the slanted grating. The width of each ridge 752 may be referred to as the line width. In some embodiments, the minimum feature size of mask layer 730 or the minimum line width of ridges 752 (which may be referred to as the critical dimension (CD) of a process) that can be reliably manufactured using the process may be limited due to, for example, the wavelength of the light used in the photolithography, the numerical aperture of the photolithography system, and other process-related factors (which may be referred to as $k_1$ factor).

Subsequently, in some implementations, a post-patterning (e.g., over-coating) process may be performed to over-coat slanted grating 750 with a material having a refractive index higher or lower than the material of ridges 752. For example, as described above, in some embodiments, a high refractive index material, such as Hafnia, Titania, Tungsten oxide, Zirconium oxide, Gallium sulfide, Gallium nitride, Gallium phosphide, silicon, and a high refractive index polymer, may be used for the over-coating. In some embodiments, a low refractive index material, such as silicon oxide, alumina, porous silica, or fluorinated low index monomer (or polymer), may be used for the over-coating. As a result, the difference between the refractive index of ridges 752 and the refractive index of the over-coating material in grooves 754 may be greater than 0.1, 0.2, 0.3, 0.5, 1.0, or higher.

Figure 8A:
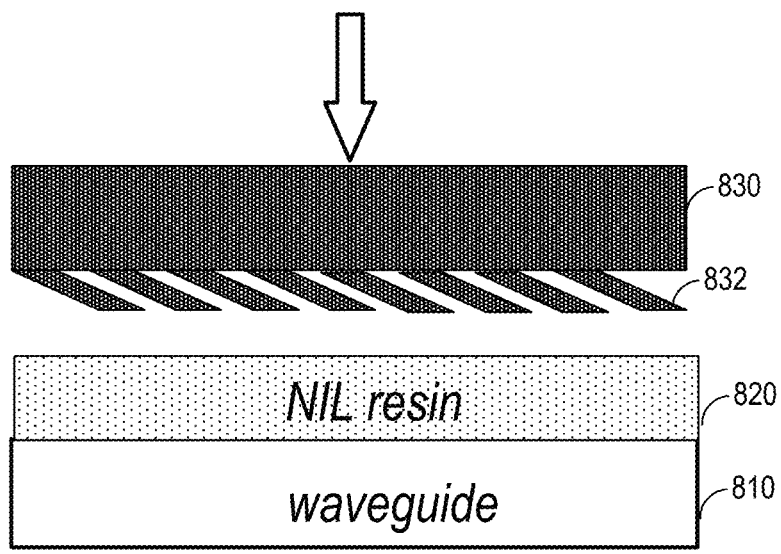
FIGS. 8A and 8B illustrate an example process for fabricating a slanted surface-relief grating by molding according to certain embodiments.
Figure 8B:
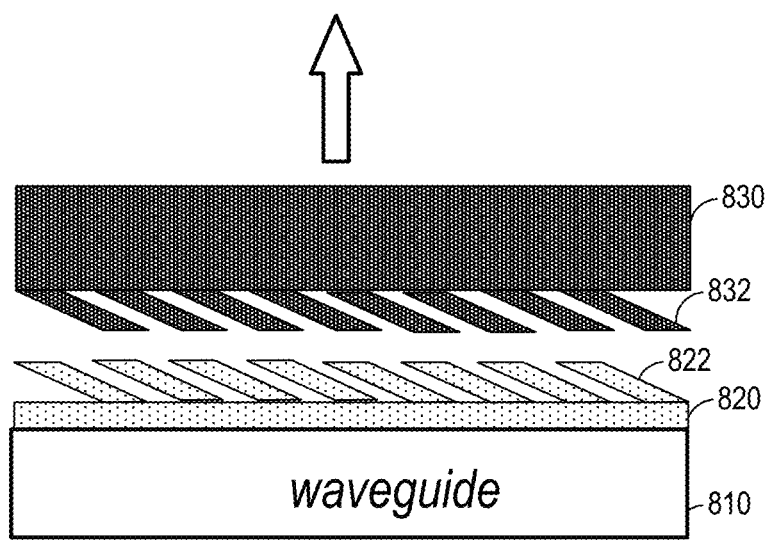

FIGS. 8A and 8B illustrate an example process for fabricating a slanted surface-relief grating by direct molding according to certain embodiments. In FIG. 8A, a waveguide 810 may be coated with a NIL resin layer 820. NIL resin layer 820 may include, for example, a butyl-acrylate-based resin doped with a sol-gel precursor (e.g., titanium butoxide), a monomer containing a reactive functional group for subsequent infusion processes (such as acrylic acid), and/or high refractive index nanoparticles (e.g., $TiO_2$, GaP, $HfO_2$, GaAs, etc.). In some embodiments, NIL resin layer 820 may include polydimethylsiloxane (PDMS) or another silicone elastomer or silicon-based organic polymer. NIL resin layer 820 may be deposited on waveguide 810 by, for example, spin-coating, lamination, or ink injection. A NIL mold 830 with slanted ridges 832 may be pressed against NIL resin layer 820 and waveguide 810 for molding a slanted grating in NIL resin layer 820. NIL resin layer 820 may be cured subsequently (e.g., cross-linked) using heat and/or ultraviolet (UV) light.

FIG. 8B shows the demolding process, during which NIL mold 830 is detached from NIL resin layer 820 and waveguide 810. As shown in FIG. 8B, after NIL mold 830 is detached from NIL resin layer 820 and waveguide 810, a slanted grating 822 that is complementary to slanted ridges 832 in NIL mold 830 may be formed in NIL resin layer 820 on waveguide 810.

In some embodiments, a master NIL mold (e.g., a hard mold including a rigid material, such as Si, $SiO_2$, $Si_3N_4$, or a metal) may be fabricated first using, for example, slanted etching, micromachining, or 3D printing. A soft stamp may be fabricated using the master NIL mold, and the soft stamp may then be used as the working stamp to fabricate the slanted grating or may be used to fabricate a next generation soft stamp. In such a process, the slanted grating structure in the master NIL mold may be similar to the slanted grating of the grating coupler for the waveguide display, and the slanted grating structure on the soft stamp may be complementary to the slanted grating structure in the master NIL mold and the slanted grating of the grating coupler for the waveguide display. Compared with a hard stamp or hard mold, a soft stamp may offer more flexibility during the molding and demolding processes.

FIGS. 9A-9D illustrate an example process 900 for fabricating a soft stamp used for making a slanted surface-relief grating according to certain embodiments. FIG. 9A shows a master mold 910 (e.g., a hard mold or hard stamp). Master mold 910 may include a rigid material, such as a semiconductor substrate (e.g., Si or GaAs), an oxide (e.g., $SiO_2$, $Si_3N_4$, $TiO_x$, $AlO_x$, $TaO_x$, or $HfO_x$), or a metal plate. Master mold 910 may be fabricated using, for example, a slanted etching process using reactive ion beams or chemically assisted reactive ion beams, a micromachining process, or a 3D printing process. As shown in FIG. 9A, master mold 910 may include a slanted grating 920 that may in turn include a plurality of slanted ridges 922 with gaps 924 between slanted ridges 922.

FIG. 9B illustrates master mold 910 coated with a soft stamp material layer 930. Soft stamp material layer 930 may include, for example, a resin material or a curable polymer material. In some embodiments, soft stamp material layer 930 may include polydimethylsiloxane (PDMS) or another silicone elastomer or silicon-based organic polymer. In some embodiments, soft stamp material layer 930 may include ethylene tetrafluoroethylene (ETFE), perfluoropolyether (PFPE), or other fluorinated polymer materials. In some embodiments, soft stamp material layer 930 may be coated on master mold 910 by, for example, spin-coating or ink injection.

FIG. 9C illustrates a lamination process for laminating a soft stamp foil 940 onto soft stamp material layer 930. A roller 950 may be used to press soft stamp foil 940 against soft stamp material layer 930. The lamination process may also be a planarization process to make the thickness of soft stamp material layer 930 substantially uniform. After the lamination process, soft stamp foil 940 may be tightly or securely attached to soft stamp material layer 930.

FIG. 9D illustrates a delamination process, where a soft stamp including soft stamp foil 940 and attached soft stamp material layer 930 is detached from master mold 910. Soft stamp material layer 930 may include a slanted grating structure that is complementary to the slanted grating structure on master mold 910. Because the flexibility of soft stamp foil 940 and attached soft stamp material layer 930, the delamination process may be relatively easy compared with a demolding process using a hard stamp or mold. In some embodiments, a roller (e.g., roller 950) may be used in the delamination process to ensure a constant or controlled delamination speed. In some embodiments, roller 950 may not be used during the delamination. In some implementations, an anti-sticking layer may be formed on master mold 910 before soft stamp material layer 930 is coated on master mold 910. The anti-sticking layer may also facilitate the delamination process. After the delamination of the soft stamp from master mold 910, the soft stamp may be used to mold the slanted grating on a waveguide of a waveguide display.

Figure 10A:
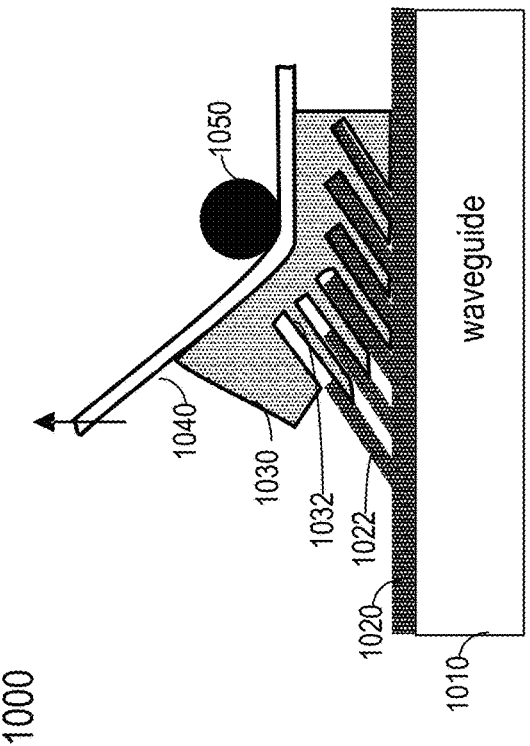
FIGS. 10A-10D illustrate an example process for fabricating a slanted surface-relief grating using a soft stamp according to certain embodiments.

FIGS. 10A-10D illustrate an example process 1000 for fabricating a slanted surface-relief grating using a soft stamp according to certain embodiments. FIG. 10A shows a waveguide 1010 coated with an imprint resin layer 1020. Imprint resin layer 1020 may include, for example, a butyl-acrylate based resin doped with a sol-gel precursor (e.g., titanium butoxide), a monomer containing a reactive functional group for subsequent infusion processes (such as acrylic acid), and/or high refractive index nanoparticles (e.g., $TiO_2$, GaP, $HfO_2$, GaAs, etc.). In some embodiments, imprint resin layer 1020 may include polydimethylsiloxane (PDMS) or another silicone elastomer or silicon-based organic polymer. In some embodiments, imprint resin layer 1020 may include ethylene tetrafluoroethylene (ETFE), perfluoropolyether (PFPE), or other fluorinated polymer materials. Imprint resin layer 1020 may be deposited on waveguide 1010 by, for example, spin-coating, lamination, or ink injection. A soft stamp 1030 including slanted ridges 1032 attached to a soft stamp foil 1040 may be used for the imprint.

Figure 10D:
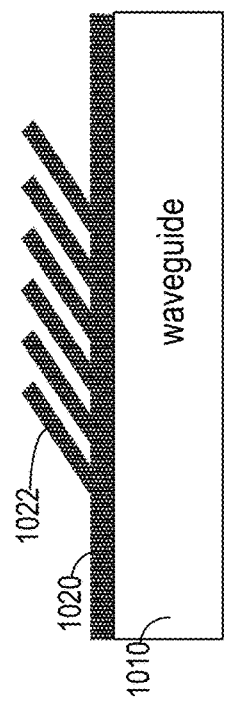
Figure 10B:
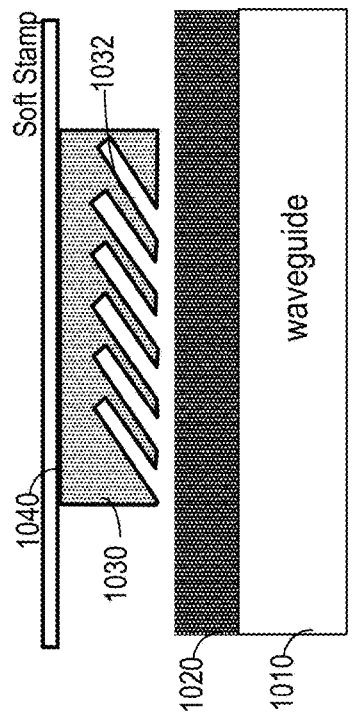

FIG. 10B shows the lamination of soft stamp 1030 onto imprint resin layer 1020. Soft stamp 1030 may be pressed against imprint resin layer 1020 and waveguide 1010 using a roller 1050, such that slanted ridges 1032 may be pressed into imprint resin layer 1020. Imprint resin layer 1020 may be cured subsequently. For example, imprint resin layer 1020 may be cross-linked using heat and/or UV light.

Figure 10C:
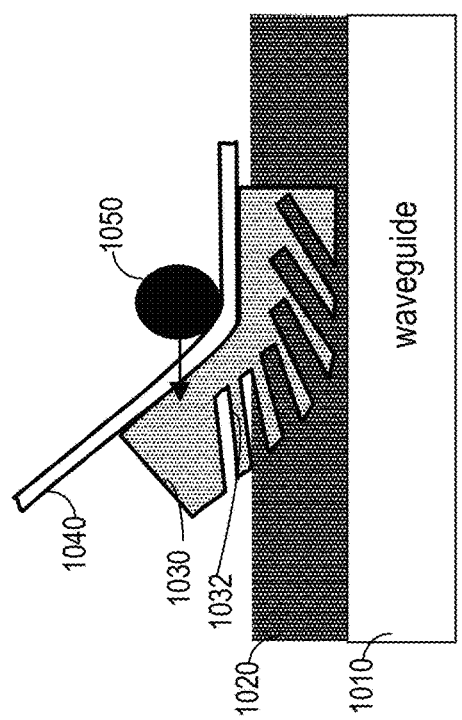

FIG. 10C shows the delamination of soft stamp 1030 from imprint resin layer 1020. The delamination may be performed by lifting soft stamp foil 1040 to detach slanted ridges 1032 of soft stamp 1030 from imprint resin layer 1020. Imprint resin layer 1020 may now include a slanted grating 1022, which may be used as the grating coupler or may be over-coated to form the grating coupler for the waveguide display. As described above, because of the flexibility of soft stamp 1030, the delamination process may be relatively easy compared with a demolding process using a hard stamp or mold. In some embodiments, a roller (e.g., roller 1050) may be used in the delamination process to ensure a constant or controlled delamination speed. In some embodiments, roller 1050 may not be used during the delamination.

FIG. 10D shows an example imprinted slanted grating 1022 formed on waveguide 1010 using soft stamp 1030. As described above, slanted grating 1022 may include ridges and gaps between the ridges and thus may be over-coated with a material having a refractive index different from imprint resin layer 1020 to fill the gaps and form the grating coupler for the waveguide display.

In various embodiments, the period of the slanted grating may vary from one area to another on slanted grating 1022, or may vary from one period to another (i.e., chirped) on slanted grating 1022. Slanted grating 1022 may have a duty cycle ranging, for example, from about 10% to about 90% or greater. In some embodiments, the duty cycle may vary from period to period. In some embodiments, the depth or height of the ridges of slanted grating 1022 may be greater than 50 nm, 100 nm, 200 nm, 300 nm, 400 nm, or higher. The slant angles of the leading edges of the ridges of slanted grating 1022 and the slant angles of the trailing edges of the ridges of slanted grating 1022 may be greater than 30°, 45°, 60°, or higher. In some embodiments, the leading edge and training edge of each ridge of slanted grating 1022 may be parallel to each other. In some embodiments, the difference between the slant angle of the leading edge of a ridge of slanted grating 1022 and the slant angle of the trailing edge of the ridge of slanted grating 1022 may be less than 20%, 10%, 5%, 1%, or less.

Figure 11:
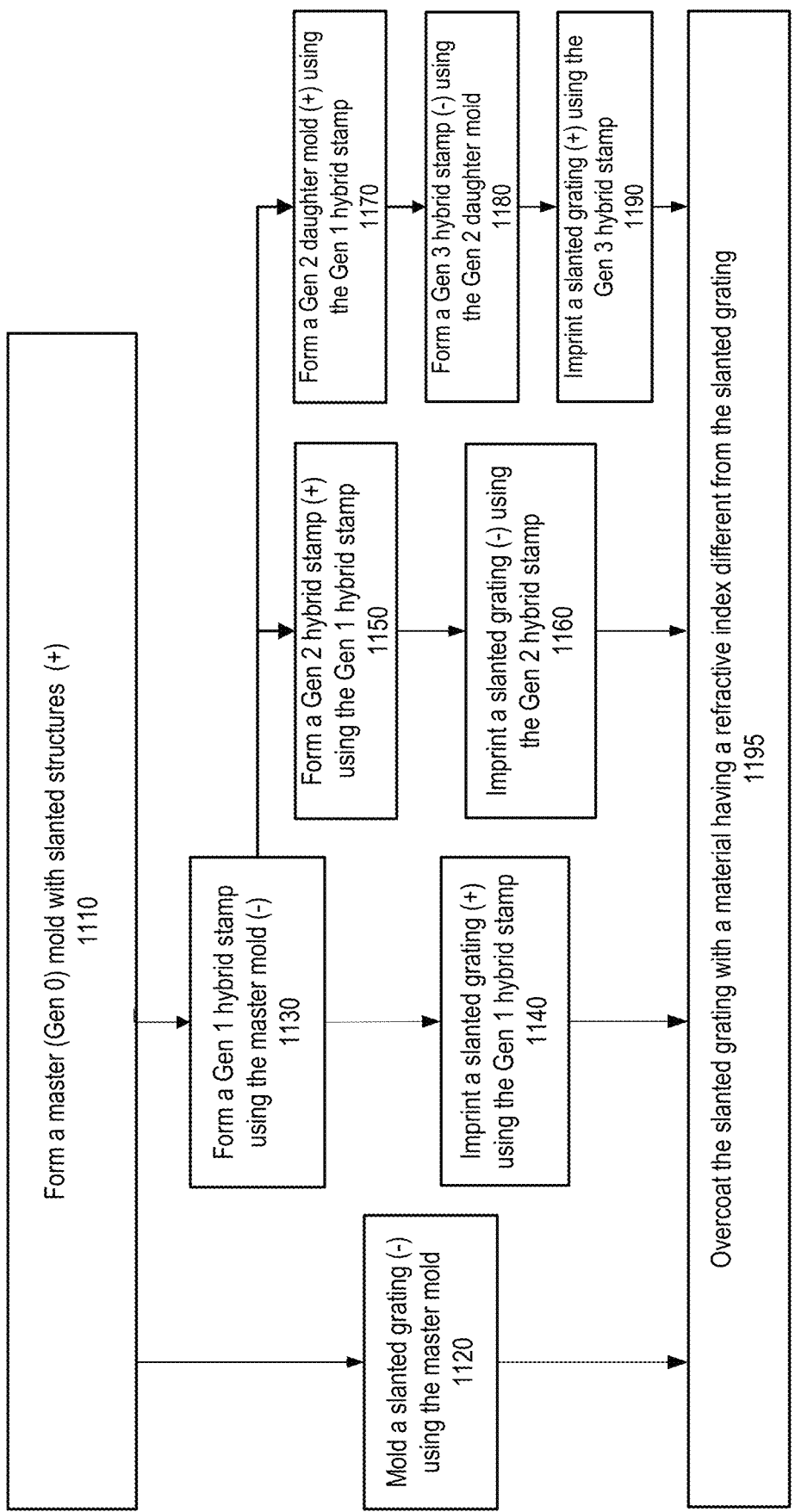
FIG. 11 is a simplified flow chart illustrating an example method of fabricating a slanted surface-relief grating using nanoimprint lithography according to certain embodiments.

FIG. 11 is a simplified flow chart 1100 illustrating example methods of fabricating a slanted surface-relief grating using nanoimprint lithography according to certain embodiments. As described above, different generations of NIL stamps may be made and used as the working stamp to mold the slanted gratings. For example, in some embodiments, a master mold (i.e., generation 0 mold, which may be a hard mold) may be used as the working stamp to mold the slanted grating directly. In some embodiments, a hybrid stamp (e.g., a generation 1 hybrid mold or stamp) may be fabricated using the master mold and may be used as the working stamp for nanoimprinting. In some embodiments, a generation 2 hybrid mold (or stamp) may be made from the generation 1 mold, and may be used as the working stamp for the nanoimprinting. In some embodiments, a generation 3 mold, a generation 4 mold, and so on, may be made and used as the working stamp.

At block 1110, a master mold with a slanted structure may be fabricated using, for example, a slanted etching process that uses reactive ion beams or chemically-assisted reactive ion beams, a micromachining process, or a 3D printing process. The master mold may be referred to as the generation 0 (or Gen 0) mold. The master mold may include quartz, fused silica, silicon, other metal-oxides, or plastic compounds. The slanted structure of the master mold may be referred to as having a positive (+) tone. The master mold may be used as a working stamp for molding the slanted grating directly (i.e., hard NIL) at block 1120. As described above, when the master mold is used as the working stamp, the slanted structure of the master mold may be complementary to the desired slanted grating. Alternatively, the master mold may be used to make a hybrid stamp as the working stamp for molding the slanted grating. The slanted structure of the hybrid stamp may be similar to the desired slanted grating or may be complementary to the desired slanted grating, depending on the generation of the hybrid stamp.

At block 1120, a slanted grating may be molded in, for example, a resin layer using the master mold as described above with respect to, for example, FIGS. 9A and 9B. The resin layer may be coated on a waveguide substrate, and may include, for example, a butyl-acrylate based resin doped with a resin comprising a sol-gel precursor (e.g., titanium butoxide), a monomer containing a reactive functional group for subsequent infusion processes (such as acrylic acid), and/or high refractive index nanoparticles (e.g., $TiO_2$, GaP, $HfO_2$, GaAs, etc.). The master mold may be pressed against the resin layer. The resin layer may then be cured to fix the structure formed within the resin layer by the master mold. The master mold may be detached from the resin layer to form a slanted grating within the resin layer. The slanted grating within the resin layer may have a negative (−) tone compared with the slanted structure of the master mold.

Alternatively, at block 1130, a hybrid stamp (e.g., a hard stamp, a soft stamp, or a hard-soft stamp) with a slanted structure may be fabricated using the master mold as described above with respect to, for example, FIGS. 9A-9D or the process described with respect to, for example, FIGS. 10A-10D. For example, the process of fabricating the hybrid stamp may include coating the master mold with a soft stamp material, such as a resin material described above. A soft stamp foil may then be laminated on the soft stamp material, for example, using a roller. The soft stamp foil and the attached soft stamp material may be securely attached to each other and may be detached from the master mold to form the soft stamp. The hybrid stamp fabricated at block 1130 may be referred to as a generation 1 (or Gen 1) stamp. The slanted grating within the Gen 1 stamp may have a negative (−) tone compared with the slanted structure of the master mold.

At block 1140, a slanted surface-relief grating may be imprinted using the Gen 1 stamp as described above with respect to, for example, FIGS. 9A-9D. For example, a waveguide substrate may be coated with an imprint resin layer. The Gen 1 stamp may be laminated on the imprint resin layer using, for example, a roller. After the imprint resin layer is cured, the Gen 1 stamp may be delaminated from the imprint resin layer to form a slanted grating within the imprint resin layer. The slanted grating within the imprint resin layer may have a positive tone.

Alternatively, in some embodiments, at block 1150, a second generation hybrid stamp (Gen 2 stamp) may be fabricated using the Gen 1 stamp using a process similar to the process for fabricating the Gen 1 stamp as described above with respect to, for example, FIGS. 9A-9D. The slanted structure within the Gen 2 stamp may have a positive tone.

At block 1160, a slanted surface-relief grating may be imprinted using the Gen 2 stamp as described above with respect to, for example, FIGS. 9A-9D. For example, a waveguide substrate may be coated with an imprint resin layer. The Gen 2 stamp may be laminated on the imprint resin layer using, for example, a roller. After the imprint resin layer is cured, the Gen 2 stamp may be delaminated from the imprint resin layer to form a slanted grating within the imprint resin layer. The slanted grating within the imprint resin layer may have a negative tone.

Alternatively, in some embodiments, at block 1170, a second generation (Gen 2) daughter mold may be fabricated using the Gen 1 stamp using a process similar to the process for fabricating the Gen 1 stamp as described above with respect to, for example, FIGS. 9A-9D. The slanted structure within the Gen 2 daughter mold may have a positive tone.

At block 1180, a third generation hybrid stamp (Gen 3 stamp) may be fabricated using the Gen 2 daughter mold using a process similar to the process for fabricating the Gen 1 stamp or the Gen 2 daughter mold as described above with respect to, for example, FIGS. 9A-9D. The slanted structure within the Gen 3 stamp may have a negative tone.

At block 1190, a slanted surface-relief grating may be imprinted using the Gen 3 stamp as described above with respect to, for example, FIGS. 10A-10D. For example, a waveguide substrate may be coated with an imprint resin layer. The Gen 3 stamp may be laminated on the imprint resin layer using, for example, a roller. After the imprint resin layer is cured, the Gen 3 stamp may be delaminated from the imprint resin layer to form a slanted grating within the imprint resin layer. The slanted grating within the imprint resin layer may have a positive tone.

Even though not shown in FIG. 11, in some embodiments, a fourth generation hybrid stamp, a fifth generation hybrid stamp, and so on, may be fabricated using a similar process, and may be used as the working stamp for imprinting the slanted grating. In some implementations, the surface of any of the master mold, gen 1 stamp, Gen 2 stamp, and Gen 3 stamp may be coated or plated prior to imprinting to reduce wearing of the mold, improve product quality, and reduce manufacturing cost. For example, in some implementations, an anti-sticking layer may be coated on the mold before the molding (or imprinting) process.

Optionally, at block 1195, the slanted grating may be over-coated with a material having a refractive index different from the slanted grating (e.g., the imprint resin layer). For example, in some embodiments, a high refractive index material, such as Hafnia, Titania, Tungsten oxide, Zirconium oxide, Gallium sulfide, Gallium nitride, Gallium phosphide, silicon, or a high refractive index polymer, may be used to over-coat the slanted grating and fill the gaps between the slanted grating ridges. In some embodiments, a low refractive index material, such as silicon oxide, magnesium fluoride, porous silica, or fluorinated low index monomer (or polymer), and the like, may be used to over-coat the slanted grating and fill the gaps between the slanted grating ridges.

In some embodiments, an etching system, such as an ion beam etching (IBE) system, may be used to etch a surface-relief structure, such as a slanted surface-relief grating described above or a master mold for imprinting a surface-relief grating for a waveguide-based near-eye display system, as described above with respect to FIGS. 7A-7C.

Figure 12:
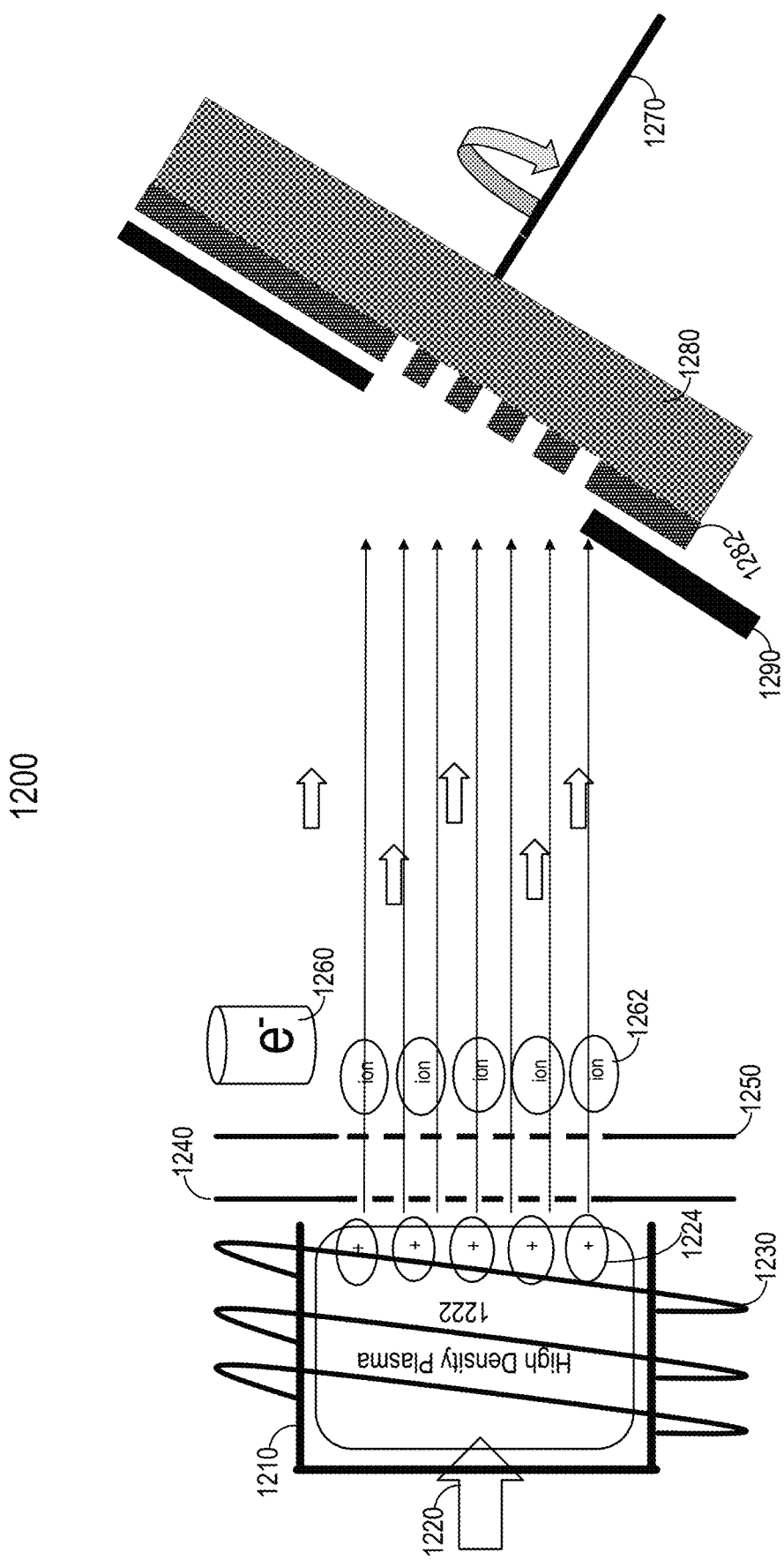
FIG. 12 illustrates an example of an ion beam etching system for etching a slanted surface-relief structure according to certain embodiments.

FIG. 12 illustrates an example of an ion beam etching (IBE) system 1200 for etching a slanted surface-relief structure according to certain embodiments. Ion beam etching generally uses a highly collimated and highly directional ion beam to physically mill materials from a substrate that is mounted on a rotation stage with an adjustable rotation angle. IBE system 1200 may include an ion source generator 1210. Ion source generator 1210 may include an inert gas inlet 1220 for receiving an inert gas, such as argon gas, into a chamber of ion source generator 1210. A plasma may be generated in ion source generator 1210 via a radio frequency (RF) inductively coupled plasma (ICP) generator 1230, where highly energetic electrons may ionize neutrals of the injected inert gas (e.g., Ar) through collisions with the neutrals. A high density plasma 1222 may be generated within ion source generator 1210 by the impact ionization. High density plasma 1222 may be considered as a sea of neutrals with positive ions 1224 and negative electrons in charge equilibrium.

IBE system 1200 may also include one or more aligned collimator grids for extracting a collimated ion beam 1262 from high density plasma 1222 that is formed within ion source generator 1210. The aligned collimator grids may be implemented in various ways. For example, as shown in FIG. 12, the aligned collimator grids may include an extraction grid 1240 that may contact high density plasma 1222 and control its potential, and an acceleration grid 1250 that may be driven by an adjustable negative high voltage supply for accelerating the extracted ions. A beam neutralizer 1260 may be disposed near the aligned collimator grids and may emit an electron beam into collimated ion beam 1262 to achieve a net neutral charge flux associated with collimated ion beam 1262 in order to prevent the buildup of positive charges on the structure to be etched.

The highly directional collimated ion beam 1262 may physically mill materials from a material layer 1280 to be etched, such as, for example, a semiconductor wafer, a glass substrate, a Si$_3$N$_4$ material layer, a titanium oxide layer, an alumina layer, and the like. Material layer 1280 may be partially covered by a mask 1282, which may be formed on material layer 1280 by, for example, a photolithography process. Mask 1282 may include, for example, a photoresist material, a metal (e.g., copper, chrome, aluminum, or molybdenum), an intermetallic compound (e.g., MoSi$_2$), or a polymer. In some embodiments, a shutter 1290 (or blade) may be used to control the etch time and/or the etch region. Material layer 1280 may be mounted on a rotation stage 1270 that can be rotated to modify the angle of material layer 1280 with respect to the highly directional collimated ion beam 1262. The ability to modify the angle of material layer 1280 may allow for the creation of tailored sidewall profiles (e.g., slant angle) with minimal sputtered re-deposition on mask 1282.

In some embodiments, a chemically assisted ion beam etching (CAIBE) system may be used for fabricating a slanted surface-relief structure. In the chemically assisted ion beam etching, reactive species, such as a reactive gas (e.g., CF$_4$, CHF$_3$, N$_2$, O$_2$, SF$_6$, Cl$_2$, BCl$_3$, HBr, etc.) may be introduced into the process independent of the ion beam. Thus, the material layer to be etched may be etched both physically and chemically.

In some embodiments, a reactive ion beam etching (RIBE) system may be used for fabricating a slanted surface-relief structure. The reactive ion beam etching system may be similar to IBE system 1200, except that a reactive gas (e.g., CF$_4$, CHF$_3$, N$_2$, O$_2$, SF$_6$, etc.) may also be injected into the ion source generator to form a reactive ion beam that can both physically and chemically etch the material layer to be etched.

As described above, to selectively couple display light and/or ambient light into and/or out of the waveguide and into user's eyes, improve the field of view, increase brightness or power efficiency, reduce display artifacts (e.g., rainbow artifacts), and improve other performances of a waveguide display, a slanted surface-relief grating having a large range of grating duty cycles (e.g., from about 0.3 to about 0.9), large slant angles (e.g., greater than 30°, 45°, 60°, or larger), small periods (e.g., less than a micron), and high depths (e.g., greater than 100 nm, 200 nm, or 300 nm) may be desired. However, it may be challenging to more efficiently and more accurately manufacture a slanted grating that has a large depth, a large slanted angle, and a wide range of duty cycles (in particular, large duty cycles) on a substrate.

As also described above, the slanted surface-relief structures may be fabricated using many different nanofabrication techniques, such as lithography and etching techniques or NIL molding techniques. The NIL molding techniques may use a master mold to make different generations of stamps for the NIL molding as described above with respect to FIGS. 8A-11. The nanostructure in the master mold may be etched using, for example, etching techniques described above. However, when the slanted surface-relief structure to be fabricated has a large slant angle (e.g., greater than 30°, 45°, or 60°), a small grating period (e.g., less than a few microns, 1 μm, 500 nm, 200 nm, 100 nm, or lower), a high depth (e.g., >100 nm), a high aspect ratio (e.g., 3:1, 5:1, 10:1, or larger), and/or a large or small duty cycle (e.g., below 30% or greater than 70%), it may be difficult to etch or imprint a slanted surface-relief structure due to certain properties of the etching or nanoimprinting process. In a nanoimprint process, when the desired slanted surface-relief structure has both a high grating depth and a large duty cycle, cracking or breaking at least some grating ridges of the mold, stamp, or the imprinted slanted surface-relief structure may occur during, for example, the demolding process, due to the small feature sizes of the grating ridges of the mold, stamp, or the imprinted slanted surface-relief structure. In a dry etching process, the etch rate may be lower when the duty cycle is large and/or when the period of the grating is small (e.g., less than 1 μm, 500 nm, 200 nm, or 100 nm) such that the trenches to be etched may have high aspect ratios, while the etch rate may be higher when the duty cycle is small and/or when the grating period is large. Thus, the etch depth by an etching process may correlate with the duty cycle and/or the grating period, and may not be a parameter that is independent from the duty cycle and/or the grating period and thus can be independently selected or tuned. In addition, the etch rate for etching a grating with a large duty cycle may be very low.

Figure 13A:
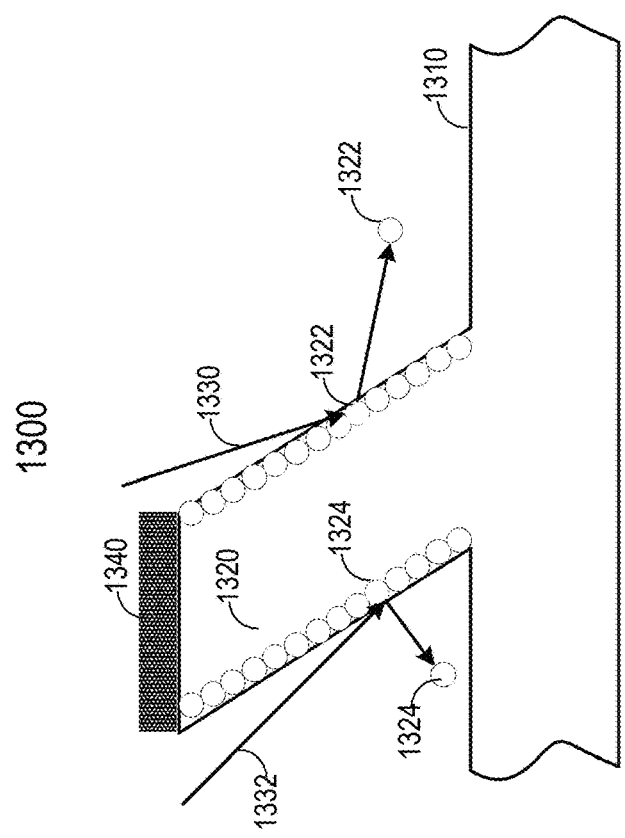
FIG. 13A illustrates an example of etching a slanted grating.

FIG. 13A illustrates an example of etching a slanted grating 1320 using a fabrication process according to certain embodiments. The fabrication process shown in FIG. 13 may be a physical or physical/chemical etching process, where ions or other particles may be used to bombard a substrate 1310 and/or react with the material in substrate 1310. A mask 1340 may be used to block the particles in regions not to be etched, which may form the ridges of slanted grating 1320.

For a deep straight or slanted grating with a small duty cycle or a large grating period, the grating grooves may be relatively wide or may have a lower aspect ratio (depth divided by width) and thus the residues from the etching may be relatively easy to remove, and thus the etch rate may be higher. However, for a deep grating with a large duty cycle or a small period where the grating grooves may have higher aspect ratios, even if the grating may be a straight grating rather than a slanted grating, the residues from the etching may be relatively difficult to remove from the etched regions, and thus the etch rate may be relatively lower. In addition, depletion of ions may occur when ions are captured by the sidewalls due to the angular distribution of incoming ions into the trench opening and the electrostatic fields in the trench, which may also reduce the etch rate. Thus, under a same etching condition (e.g., same ion beam dosage and etch time), regions of the grating having a smaller duty cycle may be etched faster and deeper than regions of the grating having a larger duty cycle. As such, for nanostructures with trenches of different dimensions and/or aspect ratios coexisting on a same substrate, the etched depths may be different for different trenches after a same etching process.

As also shown in FIG. 13A, on one side (e.g., trailing edge) of a ridge of slanted grating 1320, incoming particles may hit the trailing edge as shown by the line 1330, and a molecule or atom 1322 at the surface of the grating ridge may be dislocated from the grating ridge due to the impact by the incoming particles. Molecule or atom 1322 of the grating material may move in a direction such that it can be easily removed from the grating ridge region as shown in FIG. 13A. Thus, the dislocated molecules or atoms would not accumulate at the bottom of the grooves of the slanted grating. On the other side (e.g., the leading edge) of the ridge of the slanted grating, incoming particles may hit the leading edge as shown by the line 1332, and a molecule or atom 1324 at the surface of the grating ridge may be dislocated from the grating ridge due to the impact by the incoming particles. However, due to the direction of the incoming particles, molecule or atom 1324 of the grating material may be pushed further into the grating ridge or may be remove from the grating ridge at a direction such that molecule or atom 1324 may accumulate at the bottom of the grooves of the slanted grating. As such, the etch rate at the leading edge of the grating ridges may be lower and/or the materials etched from the leading edges of the grating ridges may accumulate at the bottom of the grooves of the slanted grating, which may cause the slant angle or depth of the leading edge to be different from the slant angle or depth of the trailing edge.

Figure 13B:
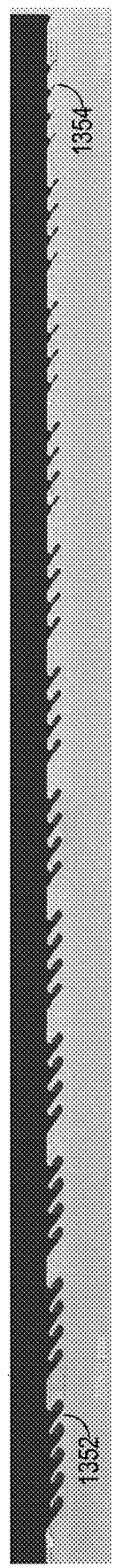
FIG. 13B illustrates an example of a slanted grating fabricated using an etching process.

FIG. 13B illustrates an example of a slanted grating 1350 fabricated using an etching process. As shown, in section 1352, the grating duty cycle may be small and thus the grating grooves may be wider. Therefore, the etch depth in slanted grating 1350 may be higher, such as about 200 nm as shown in the example. In contrast, in section 1354 where the grating duty cycle may be large and thus the grating grooves may be narrower, the etch depth in slanted grating 1350 may be lower, such as about 75 nm as shown in FIG. 13B. This effect may be referred to as the RIE lag effect, where smaller trenches may be etched at lower rates than larger trenches.

Figure 14:
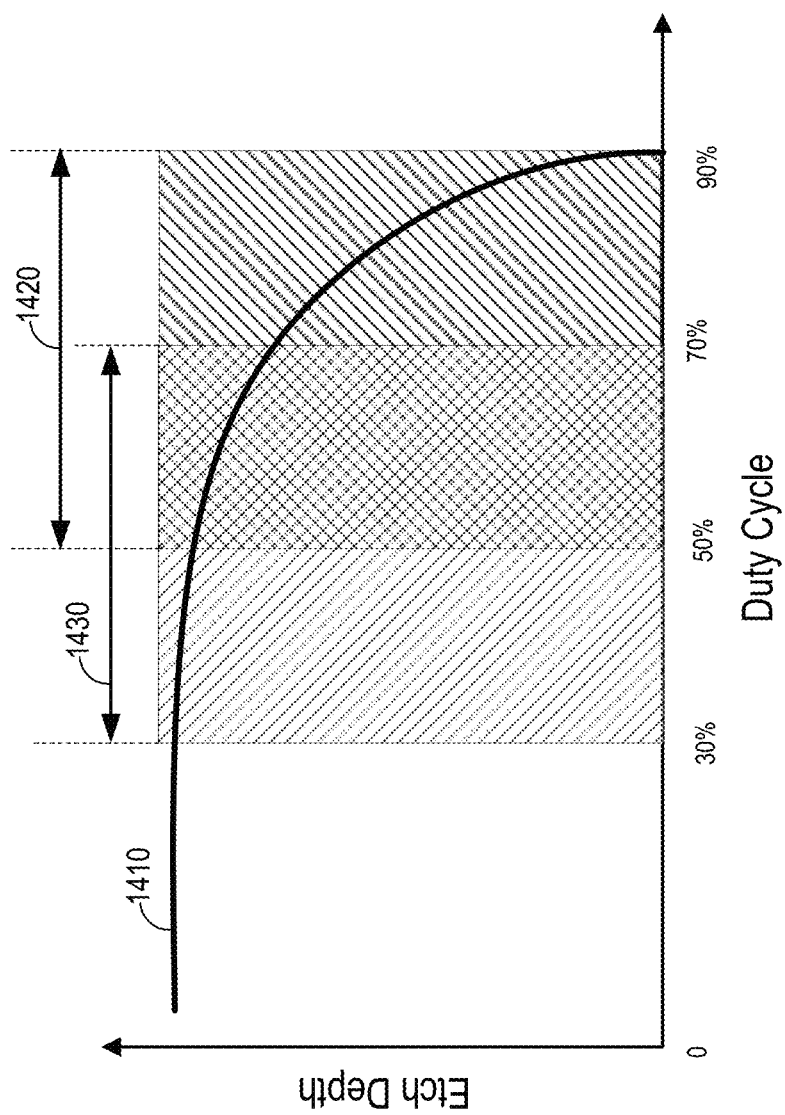
FIG. 14 illustrates an example of a reactive ion etching lag curve that represents the relationship between duty cycles and etch depths of surface-relief structures etched using ME.

FIG. 14 illustrates an example of an RIE lag curve 1410, which represents the relationship between duty cycles and etch depths of structures etched using RIE. Specifically, the horizontal axis represents the duty cycle values, which range from 0% to 100%. As discussed above, for a structure having ridges and trenches, the duty cycle refers to the ratio between the width of a ridge and the combined width of the ridge and the adjacent trench (i.e., a period). The vertical axis represents the relative etch depth that can be achieved for each respective duty cycle using a same RIE process after a same etch duration. It should be noted that RIE lag curve 1410 shown in FIG. 14 is for illustration purposes only and may only illustrate a general trend. Depending on the materials to be etched, the etch system used, the etchants used, and/or the etching conditions, the actual RIE lag curve may vary from one etching condition to another etching condition.

As shown in FIG. 14, as the duty cycle increases (i.e., the width of the ridge increases and/or the width of the trench decreases), for a given etch duration, the etch depth that can be achieved by an ME process gradually decreases. This is because there are abundant ions for the etch reaction to occur regardless of the duty cycle, but the ion mean free path may be shorter inside small trenches, which may lower the effectiveness of the etching. Also, the etching by-products may not be efficiently transported out of the etched trenches when the duty cycle is relatively large. The lag in the by-product transport to the trench opening may result in a lower etch depth when the duty cycle is larger.

In the example shown in FIG. 14, when the duty cycle changes from, for example, below about 50% to about 90% or higher, the etch depth can reduce significantly. It should be noted that although FIG. 14 illustrates that when the duty cycle is about 50% or below, the effect of duty cycle on the etch depth may be relatively small in some embodiments, in some other embodiments, the effect of duty cycle on the etch depth may still be significant even when the duty cycle is below 50%, below 40%, or below 30% because the etch depth also depends on the grating pitch or periods. For example, for gratings having a common duty cycle but different grating periods, the grating having a larger period may have a wider trench, which may lead to a deeper etched trench. Thus, as the grating period changes, the ME lag curve may start to drop at a duty cycle different from that shown in FIG. 14.

According to certain embodiments, to fabricate a nanostructure (e.g., a molded or etched slanted grating or a master mold for NIL) with a duty cycle range that includes large duty cycles (e.g., from about 0.5 to about 0.9 as shown by a region 1420 in RIE lag curve 1410), an initial nanostructure with reduced duty cycles (e.g., from about 0.3 to about 0.7 as shown by region 1430 in RIE lag curve 1410) may be imprinted or etched first, where the mask for the etching and/or the stamp for the nanoimprint may be adjusted to have duty cycles smaller (or larger for a negative working stamp) than the desired duty cycles of the nanostructure. One or more layers of materials may then be deposited on the surfaces of the initial nanostructure to increase the duty cycles of the nanostructure. For example, one or more uniform layers of oxide (e.g., $SiO_2$, $Al_2O_3$, $TiO_2$, $HfO_2$, $ZrO_2$, $ZnO_2$, $Si_3N_4$, and the like) may be conformally deposited on the surfaces of the initial nanostructure using techniques such as atomic layer deposition (ALD) to increase the duty cycles of the nanostructure. In some embodiments, the materials of the deposited layers may have refractive indices close to or higher than the refractive index of the imprinted or etched initial nanostructure.

Figure 15:
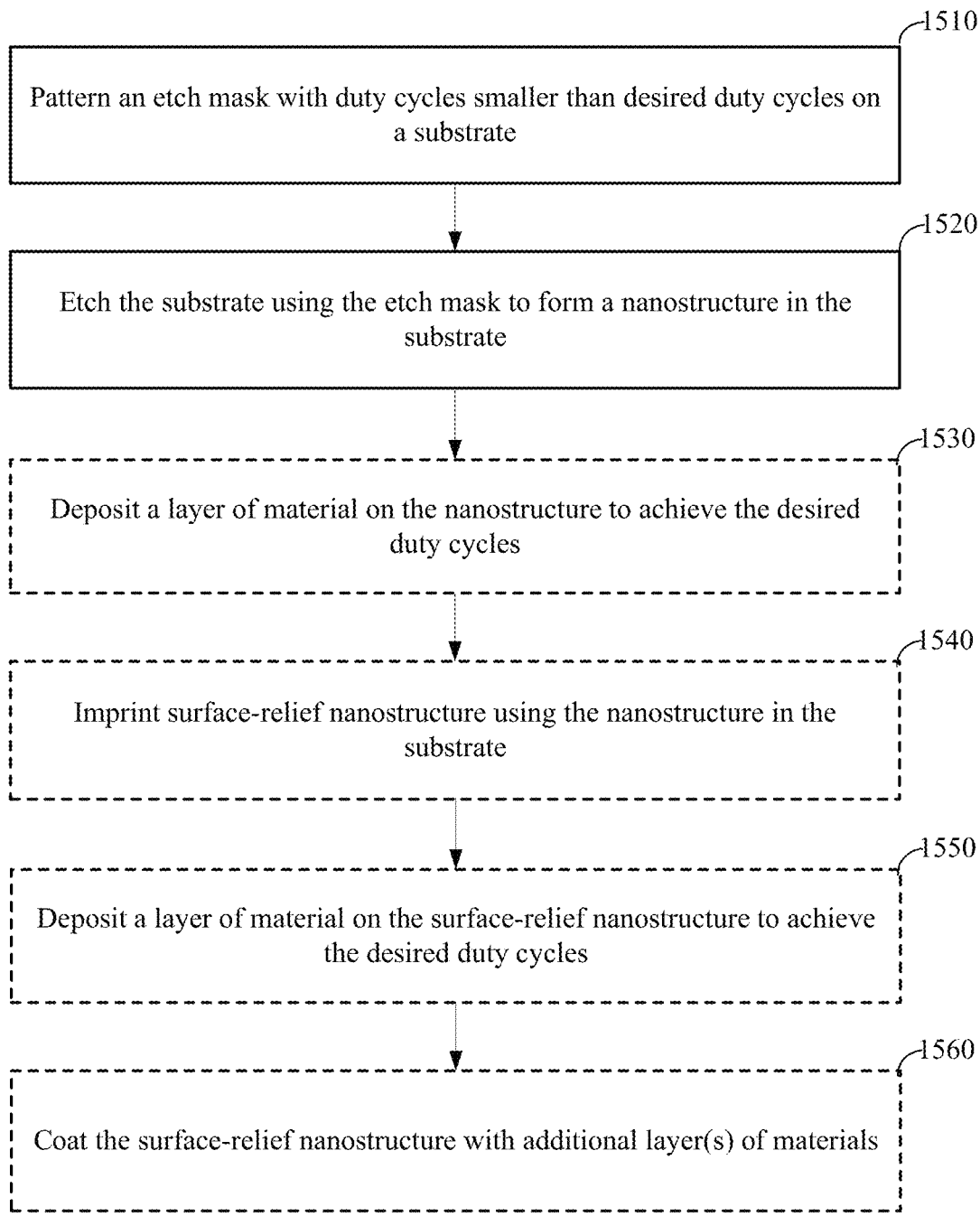
FIG. 15 is a flow chart illustrating an example of a method for fabricating a surface-relief grating with large duty cycles according to certain embodiments.

FIG. 15 is a flow chart 1500 illustrating an example of a method for fabricating a surface-relief grating with large duty cycles according to certain embodiments. The operations described in flow chart 1500 are for illustration purposes only and are not intended to be limiting. In various implementations, modifications may be made to flow chart 1500 to add additional operations or to omit some operations.

At block 1510, an etch mask with duty cycles smaller than the desired duty cycles may be patterned on a substrate. The substrate may include a metal, dielectric, semiconductor, or ceramic substrate, such as a metal alloy substrate, a silicon substrate, a $SiO_2$ layer, a $Si_3N_4$ material layer, a titanium oxide layer, an alumina layer, a SiC layer, a $SiO_xN_y$ layer, an amorphous silicon layer, a spin on carbon (SOC) layer, an amorphous carbon layer (ACL), a diamond like carbon (DLC) layer, a $TiO_x$ layer, an $AlO_x$ layer, a $TaO_x$ layer, or a $HfO_x$ layer. The etch mask may include a photoresist mask or a hard mask, such as a metal (e.g., copper, chrome, titanium, aluminum, or molybdenum) or a metallic compound (e.g., MoSiON) mask. The etch mask may be patterned on the substrate using various lithography techniques, such as a photolithography process. The duty cycles of the pattern on the etch mask may be smaller than the desired duty cycles of the nanostructures to be fabricated. For example, as described above, to make a nanostructure with a duty cycle range that includes large duty cycles, such as from about 0.5 to about 0.9, the duty cycles of the pattern on the etch mask may be reduced to, for example, from about 0.3 to about 0.7, from about 0.25 to about 0.65, or the like, where the etch rate may be relatively high and flat for the reduced duty cycle based on the actual RIE lag curve of the etching process.

At block 1520, the substrate may be etched using the etch mask to form a nanostructure in the substrate. For example, the substrate may be vertically etched to form straight nanostructures, or may be slant-etched to form slanted nanostructure as described above, where the slant angle may be greater than about 10°, 20°, 30°, 45°, or 60°. The etching may include an ion beam etching using various chemicals, such as hydrogen ions, helium ions, oxygen ions, and reactive gases (e.g., at least one of $CF_4$, $CHF_3$, $CH_2F_2$, $CH_3F$, $C_4F_8$, $C_4F_6$, $C_2F_6$, $C_2F_8$, $NF_3$, $ClF_3$, $N_2O$, $N_2$, $O_2$, $SO_2$, COS, $SF_6$, $Cl_2$, $BCl_3$, HBr, $H_2$, Ar, He, or Ne). Because the etch mask has reduced duty cycles for which the etch rates may be substantially high and flat, the nanostructure may be etched at a higher speed and the etch depth after the etching process may be substantially the same for regions with different duty cycles. For example, a difference between the depth of a region having the minimum duty cycle and the depth of a region having the maximum duty cycle may be less than 20%, 10%, 5%, or lower of the depth of the region having the minimum duty cycle. In some embodiments, the minimum depth of the nanostructure etched in the substrate may be greater than 100 nm, 200 nm, or 300 nm.

In some embodiments, at block 1530, a layer of material may be conformally deposited on surfaces of the nanostructure. The material may include, for example, $SiO_2$, $Al_2O_3$, $TiO_2$, $HfO_2$, ZrO, $ZnO_2$, $Si_3N_4$, or the like. In some embodiments, the layer of material may be conformally deposited on the surfaces of the nanostructure by, for example, atomic layer deposition (ALD) or plasma enhanced chemical vapor deposition (PECVD). In some embodiments, the thickness of the layer of material may vary less than about 10%, 5%, 2%, 1%, or lower of the average thickness of the layer of material. In some embodiments, the thickness of the layer of material may be between about 2.5% to about 20% of the grating period. As such, the duty cycles of the nanostructure may increase by about 0.05 to about 0.4, due to the layer of material on each side of a grating ridge.

In the ALD process, the nanostructure may be exposed to, for example, two reactants, in a sequential, non-overlapping way. The ALD process can be used to uniformly deposit low refractive index materials (e.g., $Al_2O_3$ or $SiO_2$) or high refractive index materials (e.g., ZnS, $HfO_2$, or $TiO_2$) on exposed surfaces of the nanostructure. For example, the atomic layer deposition of silicon dioxide ($SiO_2$) may be performed using a variety of silicon precursors and oxidants, such as $H_2O$, oxygen plasma, or $O_3$. A first reactant may react with the exposed surfaces in a self-limited way, where the reactant molecules may react only with a finite number of reactive sites on the surfaces. Once all the reactive sites have been consumed, the reaction (or deposition) may stop, and the remaining first reactant molecules may be flushed away. A second reactant may then be injected into the reactor after the first reactant has been flushed away, and may only react with the first reactant at the finite number of reactive sites on the surfaces. Because the reactants are injected into the reactor at different times and excess reactants are purged before a different reactant is injected, the reaction does not take place in the gas phase, and is surface-limited. As such, ALD offers a high reproducibility, large-area thickness uniformity, and conformal coating on structures with a high aspect ratio. The surface-controlled ALD growth mechanism enables the precise control of film thickness within a sub-nanometer range or nanometer range as well as high repeatability. Using atomic layer deposition, the thickness of the resultant deposition layer can be precisely controlled by the number of ALD cycles.

In some embodiments, different masks and different ALD processes (e.g., cycles) may be used for the deposition of the layer of material, such that the thickness of the layer of material may be different at different regions of the nanostructure. Thus, the duty cycles at different regions of the nanostructure may be increased by different values due to the selective atomic layer deposition. In some embodiments, different materials may be deposited in at least some ALD cycles such that the layer of material includes two or more layers of different materials. After the deposition of the layer of material, the duty cycles of the nanostructure may be increased to the desired values. The nanostructure made by operations at blocks 1510-1530 may be a final product (a grating for near-eye display) or may be used as a master mold for imprinting stamps or nanostructures.

In some embodiments where the nanostructure fabricated using operations at blocks 1510-1530 is used as a master mold, surface-relief nanostructures, such as surface-relief gratings or different generations of stamps, may be imprinted in organic material layers at block 1540 using the nanostructure in the substrate as described above with respect to FIGS. 8A-11.

In some embodiments where the nanostructure fabricated using operations at blocks 1510 and 1520 is used as a master mold, surface-relief nanostructures (e.g., surface-relief gratings or different generations of stamps) imprinted in organic material layers at block 1540 using the master mold may have duty cycles lower than the desired duty cycles. At block 1550, a layer of material may be conformally deposited on surfaces of the surface-relief nanostructure. The material may include, for example, Sift, $Al_2O_3$, $TiO_2$, $HfO_2$, ZrO, $ZnO_2$, $Si_3N_4$, or the like. In some embodiments, the layer of material may be conformally deposited on the surfaces of the surface-relief nanostructure by, for example, atomic layer deposition (ALD) or plasma enhanced chemical vapor deposition (PECVD) as described above with respect to block 1530. For example, in some embodiments, multiple ALD cycles may be performed to deposit the layer of material with a desired thickness. In some embodiments, different materials may be deposited in at least some ALD cycles such that the layer of material may include two or more layers of different materials. In some embodiments, the thickness of the layer of material may vary less than about 10%, 5%, 2%, 1%, or lower of the average thickness of the layer of material. In some embodiments, the thickness of the layer of material may be between about 2.5% to about 20% of the grating period. As such, the duty cycles of the surface-relief nanostructure may increase by about 0.05 to about 0.4, due to the layer of material on each side of a grating ridge.

In some embodiments, at block 1560, one or more additional layers of materials may be deposited on the surface-relief nanostructure. The one or more additional layers of materials may include, for example, a layer of material with a higher refractive index, an overcoat layer, a patterned layer (e.g., an antireflective layer), or any combination. In some embodiments, the surface-relief nanostructure may be over-coated with a material having a refractive index different from the surface-relief nanostructure (e.g., the imprint resin layer or the substrate). For example, in some embodiments, a higher refractive index material, such as Hafnia, Titania, Tungsten oxide, Zirconium oxide, Gallium sulfide, Gallium nitride, Gallium phosphide, silicon, or a high refractive index polymer, may be used to over-coat the surface-relief nanostructure and fill the gaps in the surface-relief nanostructure. In some embodiments, a lower refractive index material, such as silicon oxide, magnesium fluoride, porous silica, or fluorinated low index monomer (or polymer), and the like, may be used to over-coat the surface-relief nanostructure and fill the gaps in the surface-relief nanostructure.

Figure 16A:
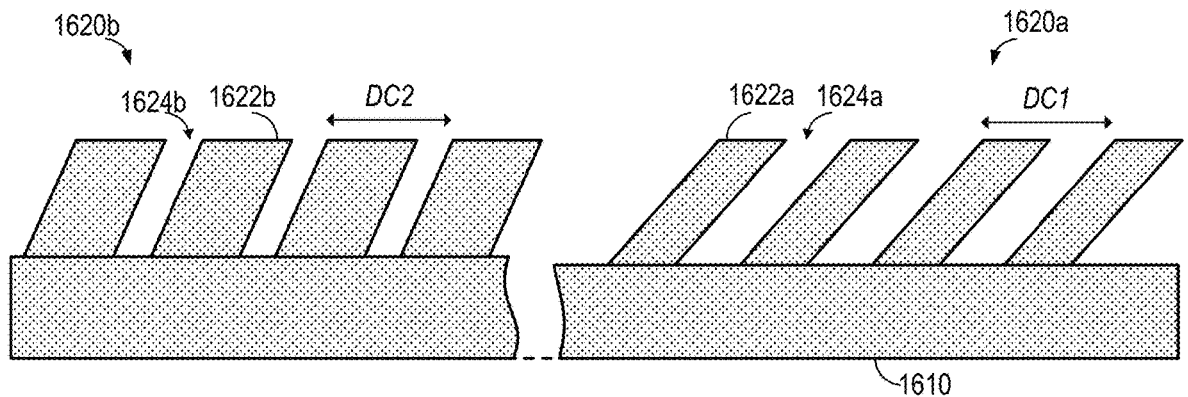
FIG. 16A illustrates an example of a slanted surface-relief grating fabricated using reactive ion etching or nanoimprint lithography according to certain embodiments.

FIG. 16A illustrates an example of a slanted surface-relief grating 1620 fabricated on a substrate 1610 using reactive ion etching or nanolithography according to certain embodiments. Surface-relief grating 1620 may be fabricated after the operations at block 1520 or at block 1540. Substrate 1610 may be any substrate as described above. Surface-relief grating 1620 may be a straight grating or a slanted grating. As shown in the example, the configuration of surface-relief grating 1620 may vary across substrate 1610 so as to improve the performance of the system using surface-relief grating 1620, such as increasing the coupling efficiency of the light to user's eyes in a waveguide display system. For example, a region 1620*a* of surface-relief grating 1620 may have a grating duty cycle DC1 that is different from the grating duty cycle DC2 of another region 1620*b* of surface-relief grating 1620. Thus, the widths of grating ridges 1622*a* and 1622*b* and/or the widths of the grating grooves 1624*a* and 1624*b* (and hence the aspect ratio in regions 1620*a* and 1620*b*) may be different. The grating period in region 1620*a* and the grating period in region 1620*b* may also be different.

As described above, the desired duty cycle at region 1620*a* and the desire duty cycle at region 1620*b* of surface-relief grating 1620 may be larger than grating duty cycle DC1 and grating duty cycle DC2, respectively. For example, the desired duty cycle in region 1620*a* may be 0.6 and the desired duty cycle in region 1620*b* may be 0.8, while grating duty cycle DC1 may be 0.5 and grating duty cycle DC2 may be 0.7 (for which the RIE lag effect may be less prominent). Thus, the widths of grating grooves 1624*a* and 1624*b* may be larger than the desired width and the aspect ratios of grating grooves 1624*a* and 1624*b* may be lower than the desired aspect ratio, while the widths of grating ridges 1622*a* and 1622*b* may be lower than the desired width. As such, the ME lag effect may be less prominent or the demolding process may be much easier in surface-relief grating 1620 due to the larger width of grating grooves 1624*a* and 1624*b* (i.e., lower duty cycles), and the desired grating depths may be relatively easy to achieve in both region 1620*a* and region 1620*b* using a same etching or imprint process, such as reactive ion etching or NIL.

Figure 16B:
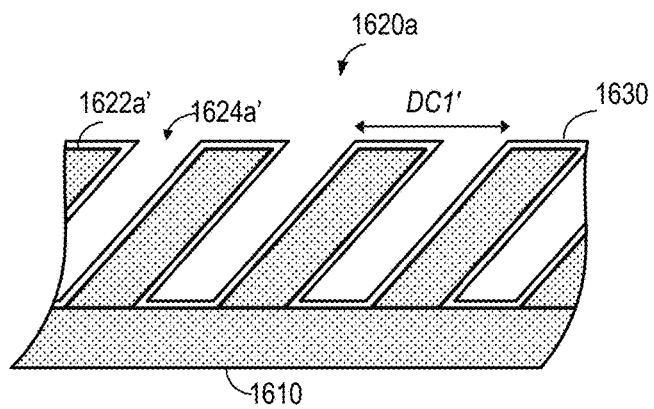
FIG. 16B illustrates a first region of the slanted surface-relief grating of FIG. 16A that has been coated with a material layer according to certain embodiments.

FIG. 16B illustrates a first region 1620*a* of surface-relief grating 1620 of FIG. 16A that has been coated with a material layer 1630 according to certain embodiments. Material layer 1630 may be conformally coated on exposed surfaces of surface-relief grating 1620 as described above with respect to, for example, block 1530 or block 1550. Material layer 1630 may be substantially uniform in thickness on all exposed surfaces of surface-relief grating 1620, and may be conformally deposited on the surfaces of surface-relief grating 1620 by, for example, one or more atomic layer deposition (ALD) cycles or plasma enhanced chemical vapor deposition (PECVD) processes. For example, in some embodiments, the thickness of material layer 1630 may vary less than about 10%, 5%, 2%, 1%, or lower of the average thickness of material layer 1630. In some embodiments, the thickness of material layer 1630 may be between about 2.5% to about 20% of the grating period. In some embodiments, multiple ALD cycles may be performed in order to achieve the desired thickness. In some embodiments, different materials may be deposited in at least some ALD cycles such that material layer 1630 may include two or more layers of different materials. As such, after the deposition of material layer 1630, the duty cycles of the nanostructure may increase by, for example, about 0.05 to about 0.4. In the example shown in FIG. 16B, the thickness of material layer 1630 may be about 5% of the grating period. As such, the duty cycle DC1' of surface-relief grating 1620 in first region 1620*a* may increase, for example, from about 0.4 to about 0.5 (i.e., by about 0.1), due to the layer of material on each side of a grating ridge.

Figure 16C:
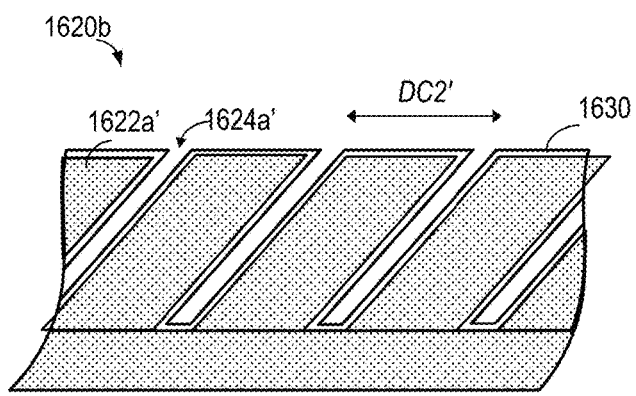
FIG. 16C illustrates a second region of the slanted surface-relief grating of FIG. 16A that has been coated with a material layer according to certain embodiments.

FIG. 16C illustrates a second region 1620*b* of surface-relief grating 1620 of FIG. 16A that has been coated with material layer 1630 according to certain embodiments. As described above, material layer 1630 may be conformally coated on exposed surfaces of surface-relief grating 1620 as described above with respect to, for example, block 1530 or block 1550. Material layer 1630 may be substantially uniform in thickness on all exposed surfaces of surface-relief grating 1620, and may be conformally deposited on the surfaces of surface-relief grating 1620 by, for example, atomic layer deposition (ALD) or plasma enhanced chemical vapor deposition (PECVD). In some embodiments, multiple ALD cycles may be performed in order to achieve a desired thickness. In some embodiments, different materials may be deposited in at least some ALD cycles such that material layer 1630 may include two or more layers of different materials. For example, in some embodiments, the thickness of material layer 1630 may vary less than about 10%, 5%, 2%, 1%, or lower of the average thickness of material layer 1630. In some embodiments, the thickness of material layer 1630 may be between about 2.5% to about 20% of the grating period. As such, the duty cycles of the nanostructure may increase by, for example, about 0.05 to about 0.4. In the example shown in FIG. 16C, the thickness of material layer 1630 may be about 5% of the grating period. As such, duty cycle DC2' of surface-relief grating 1620 in second region 1620*b* may increase, for example, from about 0.7 to about 0.8 (i.e., by about 0.1) due to the layer of material on each side of a grating ridge.

As described above, in some embodiments, a nanostructure may be imprinted in an organic material layer using a master mold that has large duty cycles and is etched using techniques described above, or may be directly etched in an organic material layer that may be etched much faster than inorganic materials, such as semiconductor, silicon dioxide, silicon nitride, titanium dioxide, alumina, ceramic, SiC, $SiO_xN_y$, amorphous silicon, spin on carbon, amorphous carbon, diamond like carbon, $TiO_x$, $AlO_x$, $TaO_x$, $HfO_x$, and the like. The organic material may have a lower refractive index, such as about 1.5. To increase the effective refractive index of the nanostructure, one or more sub-wavelength layers of a material having a high refractive index may be deposited on the surface of the nanostructure. For example, one or more uniform layers of oxide or other high refractive index materials (e.g., $Al_2O_3$, $TiO_2$, $HfO_2$, $ZrO_2$, $ZnO_2$, $Si_3N_4$, and the like) may be conformally deposited on the surfaces of the initial nanostructure using atomic layer deposition (ALD) techniques. In some embodiments, multiple ALD cycles may be performed to deposit the one or more uniform layers of high refractive index materials. In some embodiments, different materials may be deposited in at least some ALD cycles such that the one or more uniform layers of high refractive index materials may include two or more layers of different materials. The materials of the deposited layers may have refractive indices higher than the refractive index of the imprinted or etched initial nanostructure (e.g., resin, polymer, or other organic materials). The thickness of the one or more deposited layers may be significantly shorter than (e.g., a fraction of) the working wavelength of the nanostructure, such that the deposited layer may not significantly change the physical dimensions and/or certain optical performance of the nanostructure.

As also described above, in some embodiments, the surface-relief grating may be over-coated with a material having a refractive index different from the surface-relief grating (e.g., the imprint resin layer or the substrate). For example, in some embodiments, a higher refractive index material, such as Hafnia, Titania, Tungsten oxide, Zirconium oxide, Gallium sulfide, Gallium nitride, Gallium phosphide, silicon, or a high refractive index polymer, may be used to over-coat the slanted grating and fill the gaps between the slanted grating ridges. In some embodiments, a lower refractive index material, such as silicon oxide, magnesium fluoride, porous silica, or fluorinated low index monomer (or polymer), and the like, may be used to over-coat the slanted grating and fill the gaps between the slanted grating ridges.

The materials that can be deposited on the imprinted nanostructures (e.g., surface-relief gratings) may generally have refractive indices different from the refractive index of the imprinted nanostructure (e.g., comprising of polymers). In some cases, the difference in refractive index may change the optical performance of the nanostructures, such as increasing the losses at the interface between different materials (e.g., due to Fresnel reflection or total internal reflection) or changing the diffraction properties of the surface-relief gratings, in particular, when the deposited layer is relatively thick and when there may be many layers of different materials. Thus, the nanostructure with the deposited ALD layers may have increased duty cycles, but may have different optical performance than a nanostructure having the same duty cycles but made using a same material.

Figure 17A:
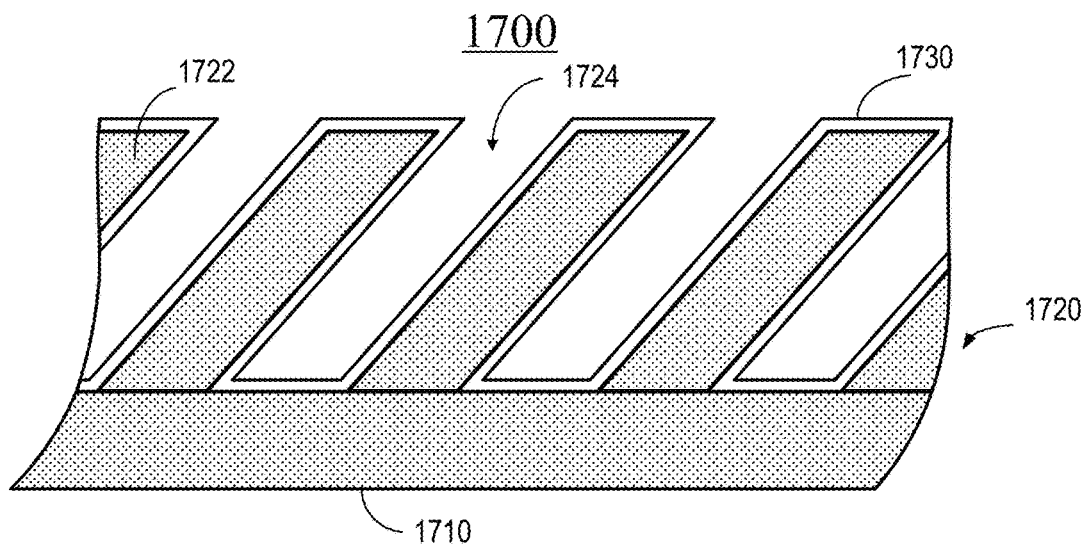
FIG. 17A illustrates an example of a slanted surface-relief structure fabricated using nanoimprint lithography and coated with a first material layer according to certain embodiments.

FIG. 17A illustrates an example of a slanted surface-relief structure 1700 fabricated using nanoimprint lithography and coated with a first material layer 1730 according to certain embodiments. Surface-relief structure 1700 may include a surface-relief grating 1720 imprinted in an imprint material layer 1710 using the NIL techniques according to certain embodiments described above. Surface-relief grating 1720 may be fabricated by the operations at block 1540. Surface-relief grating 1720 may be a straight grating or a slanted grating. In the example shown in FIG. 17A, surface-relief grating 1720 may include a plurality of slanted grating ridges 1722 and a plurality of grating grooves 1724. The width and/or slant angle of each grating ridge 1722, and the width and/or depth of each grating groove 1724 may be different at different regions of surface-relief grating 1720. Imprinted material layer 1710 may include a resin material that has a refractive index between, for example, about 1.5 and about 1.8, which may be a function of the amount of high refractive index nanoparticles in the resin material.

First material layer 1730 may be deposited on surface-relief grating 1720 using, for example, ALD processes. First material layer 1730 may have a subwavelength thickness (e.g., tens of nanometers or hundreds of nanometers) and may have an refractive index lower or higher than the refractive index of the resin material in grating ridges 1722. In order to match the refractive index of the resin material, a thin second material layer with a refractive index higher or lower than the refractive index of the resin material may be deposited on first material layer 1730 such that the combined material layers may have an effective refractive index matching the refractive index of the resin material.

Figure 17B:
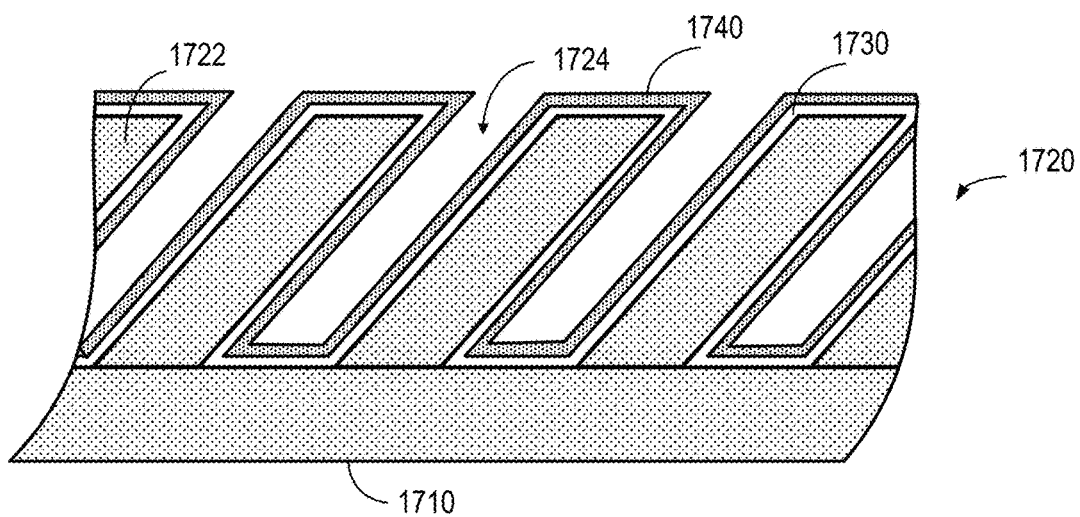
FIG. 17B illustrates the slanted surface-relief structure of FIG. 17A that has been coated with a second material layer according to certain embodiments.

FIG. 17B illustrates the slanted surface-relief structure 1700 of FIG. 17A that has been coated with a second material layer 1740 according to certain embodiments. Second material layer 1740 may be deposited on first material layer 1730 and may have a refractive index different from that of first material layer 1730. The thicknesses of second material layer 1740 and the thickness of first material layer 1730 may be selected based on the refractive indices of first material layer 1730, second material layer 1740, and the resin material in grating ridges 1722.

In one example, first material layer 1730 may have a refractive index lower than the refractive index of the resin material and second material layer 1740 may have a refractive index higher than the refractive index of the resin material. If the difference between the refractive index of first material layer 1730 and the refractive index of the resin material is greater than the difference between the refractive index of second material layer 1740 and the refractive index of the resin material, second material layer 1740 may be thicker than first material layer 1730, such that the overall effective refractive index of the combination of first material layer 1730 and second material layer 1740 may be close to the refractive index of the resin material of grating ridges 1722. Because first material layer 1730 and second material layer 1740 may be deposited using ALD processes, the thicknesses of first material layer 1730 and second material layer 1740 can be precisely controlled, and thus the effective refractive index of the combination of first material layer 1730 and second material layer 1740 can precisely match the refractive index of the resin material.

In some embodiments, to reduce the effect of the different refractive indices between grating ridges 1722 and first material layer 1730 and the different refractive indices between first material layer 1730 and second material layer 1740 on the performance of the surface-relief grating, first material layer 1730 and second material layer 1740 may need to be thin, such as about tens of nanometers or thinner, which may not be sufficient to increase the duty cycle by the desired value. According to certain embodiments, a plurality of thin material layers may be used to achieve both the refractive index matching and the desired duty cycle increase, while reducing the effect of the different materials on the performance of the surface-relief grating.

Figure 17C:
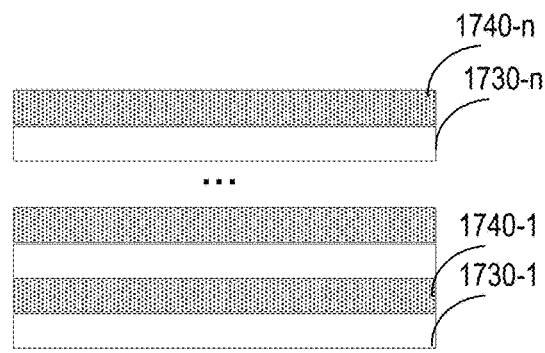

FIG. 17C illustrates an example of a stack of coating layers matching the refractive index of an imprinted surface-relief grating (e.g., surface-relief grating 1720) according to certain embodiments. In the example shown in FIG. 17C, the coating layers may include a stack of thin layers of two alternate materials, such as the two materials in first material layer 1730 and second material layer 1740 described above. For example, as shown in FIG. 17C, the stack of thin layers may include n groups of layers, where a first group of layers may include a thin layer 1730-1 of a first material having a lower refractive index and a thin layer 1740-1 of a second material having a higher refractive index, . . . , and the nth group of layers may include a thin layer 1730-n of the first material and a thin layer 1740-n of the second material. Each of the layers in the stack may have a thickness of, for example, a few nanometers or a few tens of nanometers.

In some embodiments, the materials for the stack of layers may include three or more different materials and the layers of the different materials can be arranged in any suitable manners to achieve the refractive index matching and the desired duty cycle increase. In some embodiments, the layers may have the same or different thicknesses.

In some applications, alternatively or in addition to increasing the duty cycles, it may be desirable to modify the refractive index modulation of the imprinted surface-relief grating, such as increasing or apodizing the refractive index modulation of the imprinted surface-relief grating. For example, increasing the refractive index modulation of the imprinted surface-relief grating may increase the diffraction efficiency and increase the angular bandwidth of the imprinted surface-relief grating.

Figure 18A:
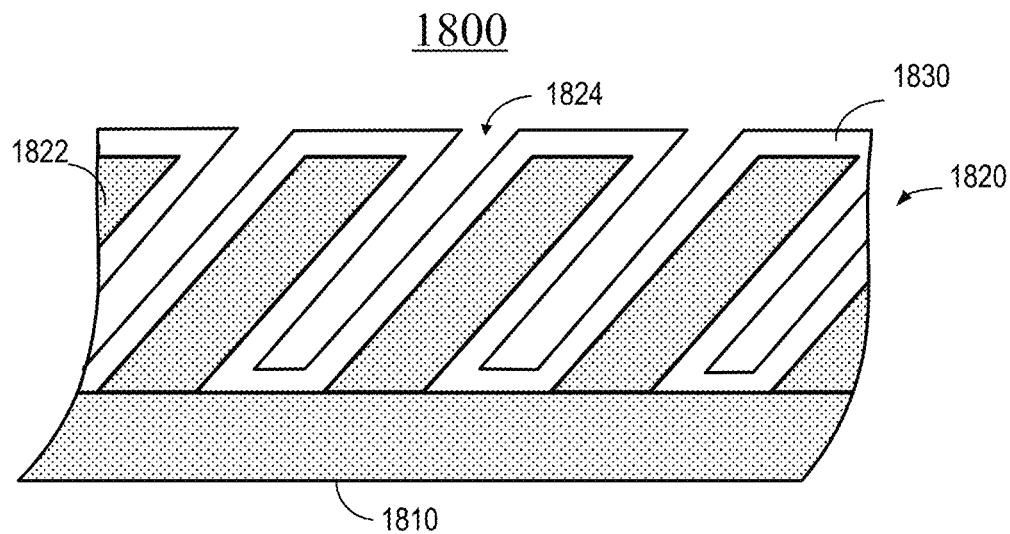
FIG. 18A illustrates an example of a slanted surface-relief structure fabricated using nanoimprint lithography and coated with one or more thin material layers according to certain embodiments.

FIG. 18A illustrates an example of a slanted surface-relief structure 1800 fabricated using nanoimprint lithography and coated with one or more thin material layers 1830 according to certain embodiments. Surface-relief structure 1800 may include a surface-relief grating 1820 imprinted in an imprint material layer 1810 using the NIL techniques according to certain embodiments described above. For example, surface-relief grating 1820 may be fabricated by the operations at block 1540. Surface-relief grating 1820 may be a straight grating or a slanted grating. In the example shown in FIG. 18A, surface-relief grating 1820 may include a plurality of slanted grating ridges 1822 and a plurality of grating grooves 1824. The width and/or slant angle of each grating ridge 1822, and the width and/or depth of each grating groove 1824 may be different at different regions of surface-relief grating 1820. Imprinted material layer 1810 may include a resin material that has a refractive index between, for example, from about 1.5 to about 1.8, which may be a function of the amount of high refractive index nanoparticles in the resin material as described above. In the example shown in FIG. 18A, the one or more thin material layers 1830 deposited on surface-relief grating 1820 may have a refractive index higher than the refractive index of grating ridges 1822.

Figure 18B:
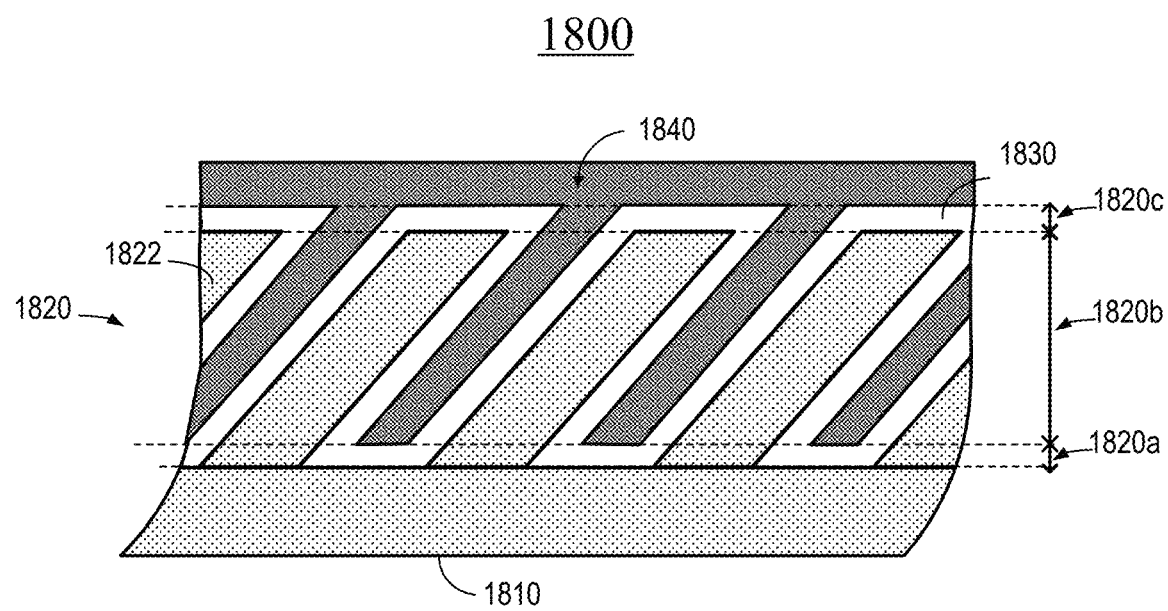
FIG. 18B illustrates the slanted surface-relief structure of FIG. 18A that has been coated with an overcoat layer according to certain embodiments.

FIG. 18B illustrates slanted surface-relief structure 1800 of FIG. 18A that has been coated with an overcoat layer 1840 according to certain embodiments. Overcoat layer 1840 may fill grating grooves 1824. Overcoat layer 1840 may include a material having a refractive index higher than the refractive index of one or more thin material layers 1830 or may include a material having a refractive index lower than the refractive index of grating ridges 1822. In one example, the refractive index of grating ridges 1822 may be about 1.6, the refractive index of material layers 1830 may be about 1.8, and the refractive index of overcoat layer 1840 may be about 2.2. As such, region 1820a of surface-relief structure 1800 may include a grating with a refractive index modulation of about 0.2 (e.g., 1.8−1.6). Region 1820b of surface-relief structure 1800 may include a grating with a refractive index modulation of about 0.4 (e.g., (1.8+2.2)/2− 1.6). Region 1820c of surface-relief structure 1800 may include a grating with a refractive index modulation of about 0.4 (e.g., 2.2−1.8). In some embodiments, the diffractions by the multiple gratings in regions 1820a, 1820b, 1820c, and the like may interfere with each other to reduce certain artifacts, such as the rainbow effect.

Figure 19A:
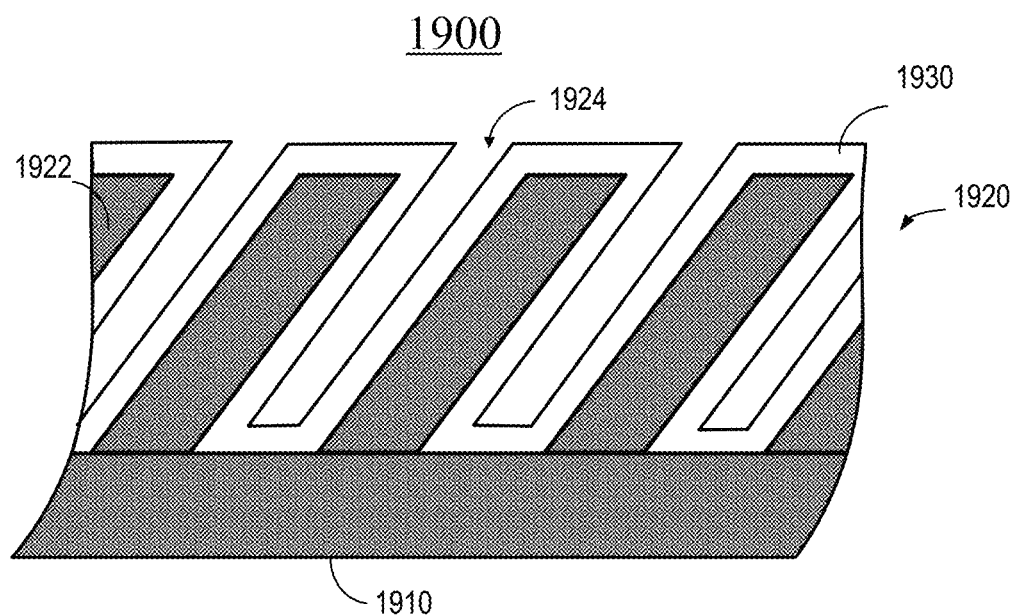
FIG. 19A illustrates an example of a slanted surface-relief structure fabricated using nanoimprint lithography and coated with one or more thin material layers according to certain embodiments.

FIG. 19A illustrates another example of a slanted surface-relief structure 1900 fabricated using nanoimprint lithography and coated with one or more thin material layers 1930 according to certain embodiments. Surface-relief structure 1900 may include a surface-relief grating 1920 imprinted in an imprint material layer 1910 using the NIL techniques according to certain embodiments described above. Surface-relief grating 1920 may be a straight grating or a slanted grating. In the example shown in FIG. 19A, surface-relief grating 1920 may include a plurality of slanted grating ridges 1922 and a plurality of grating grooves 1924. The width and/or slant angle of each grating ridge 1922, and the width and/or depth of each grating groove 1924 may be different at different regions of surface-relief grating 1920. Imprinted material layer 1910 may include a resin material that has a first refractive index, such as between about 1.5 and about 1.8. In the example shown in FIG. 19A, the one or more thin material layers 1930 deposited on surface-relief grating 1920 may have a second refractive index lower than the first refractive index.

Figure 19B:
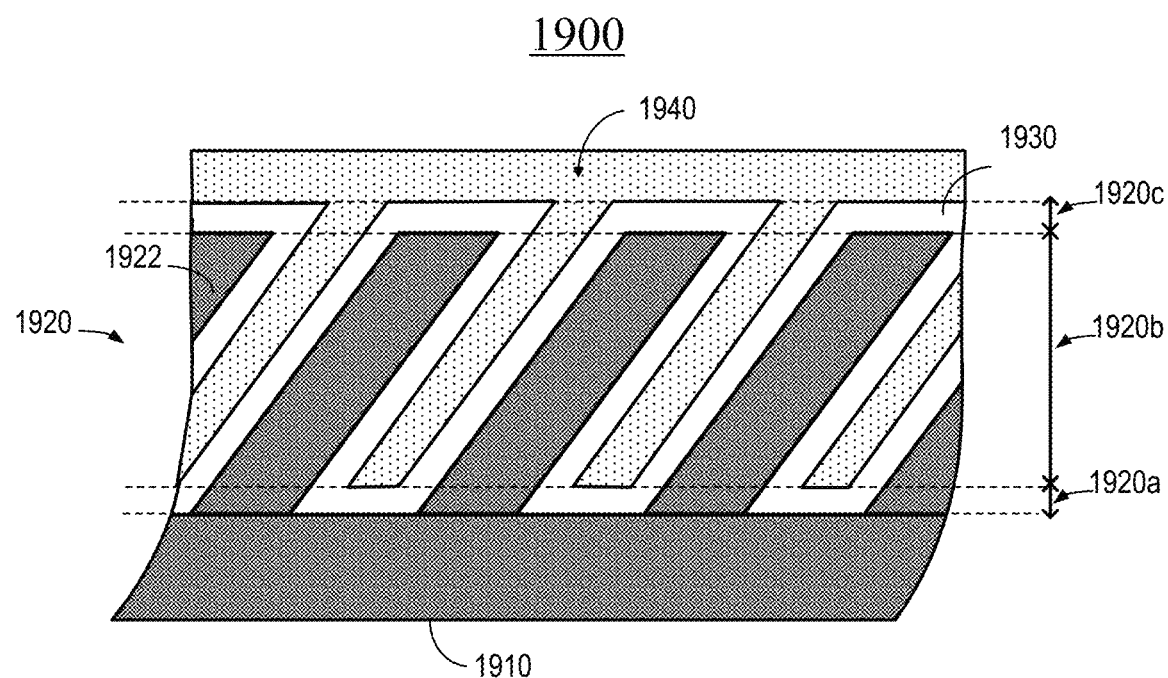
FIG. 19B illustrates the slanted surface-relief structure of FIG. 19A that has been coated with an overcoat layer according to certain embodiments.

FIG. 19B illustrates the slanted surface-relief structure 1900 of FIG. 19A that has been coated with an overcoat layer 1940 according to certain embodiments. Overcoat layer 1940 may fill grating grooves 1924. Overcoat layer 1940 may include a material having a refractive index higher or lower than the refractive index of one or more thin material layers 1930 and/or the refractive index of grating ridges 1922. In one example, the refractive index of grating ridges 1922 may be about 1.8, the refractive index of material layers 1930 may be about 1.7, and the refractive index of overcoat layer 1940 may be about 1.5. As such, region 1920a of surface-relief structure 1900 may include a grating with a refractive index modulation of about 0.1 (e.g., 1.8−1.7). Region 1920b of surface-relief structure 1900 may include a grating with a refractive index modulation of about 0.2 (e.g., (1.8−(1.7+1.5)/2). Region 1920c of surface-relief structure 1900 may include a grating with a refractive index modulation of about 0.2 (e.g., 1.7−1.5). In some embodiments, the diffractions by the multiple gratings in regions 1920a, 1920b, 1920c, and the like may interfere with each other to reduce certain artifacts, such as the rainbow effect.

As described above, in some embodiments, multiple material layers may be deposited on the imprinted surface-relief grating (e.g., surface-relief grating 1920), where the multiple material layers may have different refractive indices. In some embodiments, the refractive indices of the multiple material layers may gradually decrease or increase from the grating ridges to the overcoat layer, such that the refractive index modulation may gradually decrease to zero to form an apodized grating.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 20:
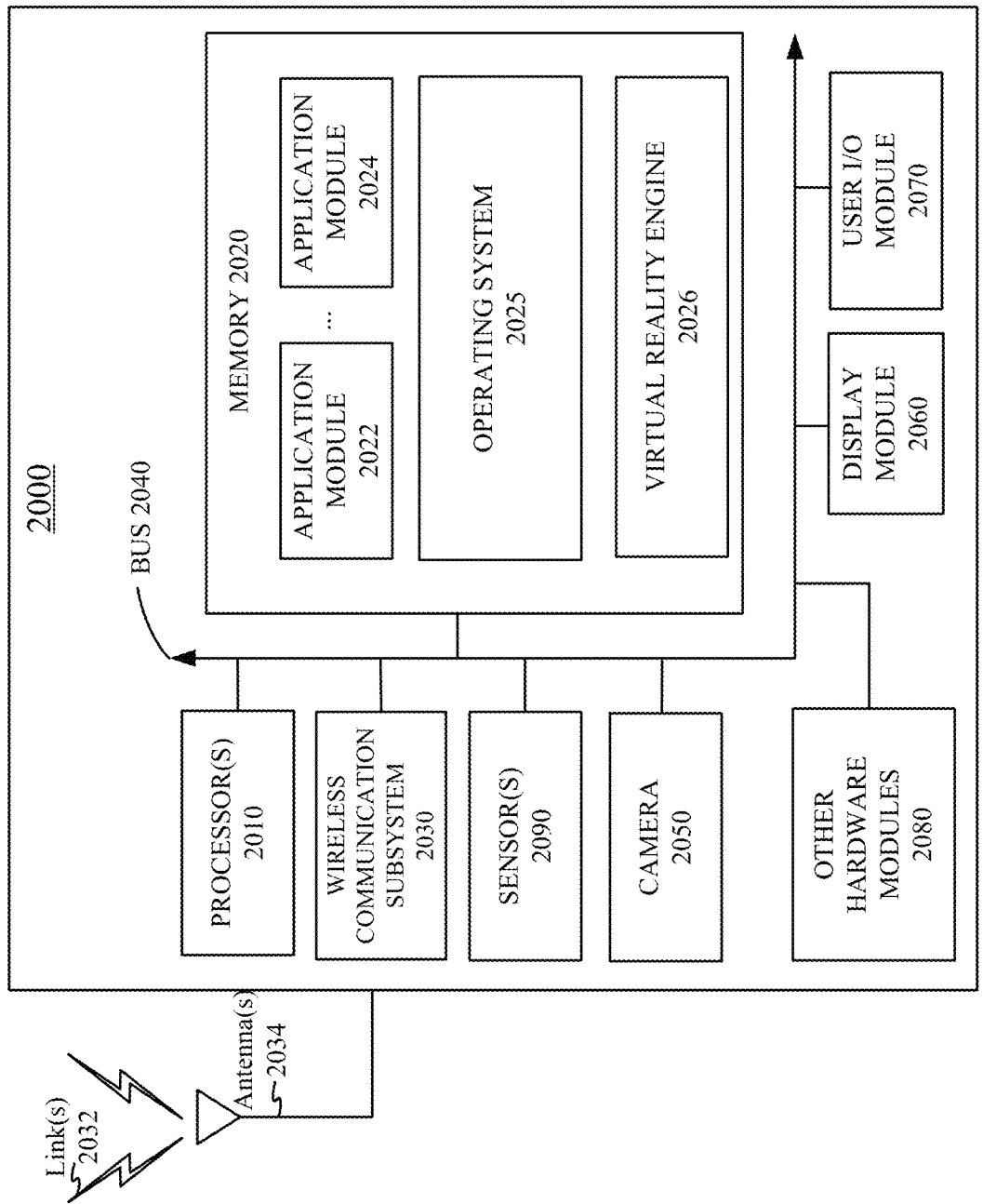
FIG. 20 is a simplified block diagram of an example of an electronic system of a near-eye display according to certain embodiments.

FIG. 20 is a simplified block diagram of an example electronic system 2000 of an example near-eye display (e.g., HMD device) for implementing some of the examples disclosed herein. Electronic system 2000 may be used as the electronic system of an HMD device or other near-eye displays described above. In this example, electronic system 2000 may include one or more processor(s) 2010 and a memory 2020. Processor(s) 2010 may be configured to execute instructions for performing operations at a number of components, and can be, for example, a general-purpose processor or microprocessor suitable for implementation within a portable electronic device. Processor(s) 2010 may be communicatively coupled with a plurality of components within electronic system 2000. To realize this communicative coupling, processor(s) 2010 may communicate with the other illustrated components across a bus 2040. Bus 2040 may be any subsystem adapted to transfer data within electronic system 2000. Bus 2040 may include a plurality of computer buses and additional circuitry to transfer data.

Memory 2020 may be coupled to processor(s) 2010. In some embodiments, memory 2020 may offer both short-term and long-term storage and may be divided into several units. Memory 2020 may be volatile, such as static random access memory (SRAM) and/or dynamic random access memory (DRAM) and/or non-volatile, such as read-only memory (ROM), flash memory, and the like. Furthermore, memory 2020 may include removable storage devices, such as secure digital (SD) cards. Memory 2020 may provide storage of computer-readable instructions, data structures, program modules, and other data for electronic system 2000. In some embodiments, memory 2020 may be distributed into different hardware modules. A set of instructions and/or code might be stored on memory 2020. The instructions might take the form of executable code that may be executable by electronic system 2000, and/or might take the form of source and/or installable code, which, upon compilation and/or installation on electronic system 2000 (e.g., using any of a variety of generally available compilers, installation programs, compression/decompression utilities, etc.), may take the form of executable code.

In some embodiments, memory 2020 may store a plurality of application modules 2022 through 2024, which may include any number of applications. Examples of applications may include gaming applications, conferencing applications, video playback applications, or other suitable applications. The applications may include a depth sensing function or eye tracking function. Application modules 2022-2024 may include particular instructions to be executed by processor(s) 2010. In some embodiments, certain applications or parts of application modules 2022-1524 may be executable by other hardware modules 2080. In certain embodiments, memory 2020 may additionally include secure memory, which may include additional security controls to prevent copying or other unauthorized access to secure information.

In some embodiments, memory 2020 may include an operating system 2025 loaded therein. Operating system 2025 may be operable to initiate the execution of the instructions provided by application modules 2022-2024 and/or manage other hardware modules 2080 as well as interfaces with a wireless communication subsystem 2030 which may include one or more wireless transceivers. Operating system 2025 may be adapted to perform other operations across the components of electronic system 2000 including threading, resource management, data storage control, and other similar functionality.

Wireless communication subsystem 2030 may include, for example, an infra-red communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2000 may include one or more antennas 2034 for wireless communication as part of wireless communication subsystem 2030 or as a separate component coupled to any portion of the system. Depending on desired functionality, wireless communication subsystem 2030 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2030 may permit data to be exchanged with a network, other computer systems, and/or any other devices described herein. Wireless communication subsystem 2030 may include a means for transmitting or receiving data, such as identifiers of HMD devices, position data, a geographic map, a heat map, photos, or videos, using antenna(s) 2034 and wireless link(s) 2032. Wireless communication subsystem 2030, processor(s) 2010, and memory 2020 may together comprise at least a part of one or more of a means for performing some functions disclosed herein.

Embodiments of electronic system 2000 may also include one or more sensors 2090. Sensor(s) 2090 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2090 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2000 may include a display module 2060. Display module 2060 may be a near-eye display, and may graphically present information, such as images, videos, and various instructions, from electronic system 2000 to a user. Such information may be derived from one or more application modules 2022-2024, virtual reality engine 2026, one or more other hardware modules 2080, a combination thereof, or any other suitable means for resolving graphical content for the user (e.g., by operating system 2025). Display module 2060 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 2000 may include a user input/output module 2070. User input/output module 2070 may allow a user to send action requests to electronic system 2000. An action request may be a request to perform a particular action. For example, an action request may be to start or end an application or to perform a particular action within the application. User input/output module 2070 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2000. In some embodiments, user input/output module 2070 may provide haptic feedback to the user in accordance with instructions received from electronic system 2000. For example, the haptic feedback may be provided when an action request is received or has been performed.

Electronic system 2000 may include a camera 2050 that may be used to take photos or videos of a user, for example, for tracking the user's eye position. Camera 2050 may also be used to take photos or videos of the environment, for example, for VR, AR, or MR applications. Camera 2050 may include, for example, a complementary metal-oxide-semiconductor (CMOS) image sensor with a few millions or tens of millions of pixels. In some implementations, camera 2050 may include two or more cameras that may be used to capture 3D images.

In some embodiments, electronic system 2000 may include a plurality of other hardware modules 2080. Each of other hardware modules 2080 may be a physical module within electronic system 2000. While each of other hardware modules 2080 may be permanently configured as a structure, some of other hardware modules 2080 may be temporarily configured to perform specific functions or temporarily activated. Examples of other hardware modules 2080 may include an audio output and/or input module (e.g., a microphone or speaker), a near field communication (NFC) module, a rechargeable battery, a battery management system, a wired/wireless battery charging system, etc. In some embodiments, one or more functions of other hardware modules 2080 may be implemented in software.

In some embodiments, memory 2020 of electronic system 2000 may also store a virtual reality engine 2026. Virtual reality engine 2026 may execute applications within electronic system 2000 and receive position information, acceleration information, velocity information, predicted future positions, or some combination thereof of the HMD device from the various sensors. In some embodiments, the information received by virtual reality engine 2026 may be used for producing a signal (e.g., display instructions) to display module 2060. For example, if the received information indicates that the user has looked to the left, virtual reality engine 2026 may generate content for the HMD device that mirrors the user's movement in a virtual environment. Additionally, virtual reality engine 2026 may perform an action within an application in response to an action request received from user input/output module 2070 and provide feedback to the user. The provided feedback may be visual, audible, or haptic feedback. In some implementations, processor(s) 2010 may include one or more graphic processing units (GPUs) that may execute virtual reality engine 2026.

In various implementations, the above-described hardware and modules may be implemented on a single device or on multiple devices that can communicate with one another using wired or wireless connections. For example, in some implementations, some components or modules, such as GPUs, virtual reality engine 2026, and applications (e.g., tracking application), may be implemented on a console separate from the head-mounted display device. In some implementations, one console may be connected to or support more than one HMD.

In alternative configurations, different and/or additional components may be included in electronic system 2000. Similarly, functionality of one or more of the components can be distributed among the components in a manner different from the manner described above. For example, in some embodiments, electronic system 2000 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A surface-relief grating comprising:
a plurality of grating ridges including a first material; and
a layer of a second material conformally deposited on surfaces of the plurality of grating ridges,
wherein:
the surface-relief grating is a contiguous grating in a contiguous area of a substrate;
a first region of the surface-relief grating is characterized by a first grating depth and a first duty cycle greater than a first threshold value;
a second region of the surface-relief grating is characterized by a second grating depth and a second duty cycle lower than a second threshold value that is lower than the first threshold value; and
a difference between the first grating depth and the second grating depth is less than 20% of the second grating depth.

2. The surface-relief grating of claim 1, wherein the first threshold value is greater than 0.7.

3. The surface-relief grating of claim 2, wherein the first threshold value is greater than 0.8.

4. The surface-relief grating of claim 1, wherein the second threshold value is lower than 0.5.

5. The surface-relief grating of claim 4, wherein the second threshold value is lower than 0.4.

6. The surface-relief grating of claim 1, wherein the first threshold value is greater than 0.8 and the second threshold value is lower than 0.4.

7. The surface-relief grating of claim 1, wherein a thickness of the layer of the second material is less than 20% of a period of the surface-relief grating.

8. The surface-relief grating of claim 1, wherein the first region of the surface-relief grating is characterized by a slant angle greater than 30°.

9. The surface-relief grating of claim 1, wherein the second grating depth is greater than 100 nm.

10. The surface-relief grating of claim 1, wherein the first material includes at least one of metal alloy, silicon, amorphous silicon, $SiO_2$, $Si_3N_4$, titanium oxide, alumina, $TaO_x$, $HfO_x$, SiC, $SiO_xN_y$, spin-on carbon (SOC), amorphous carbon, diamond-like carbon (DLC), or an organic material.

11. The surface-relief grating of claim 1, wherein the second material includes at least one of $SiO_2$, $Al_2O_3$, $TiO_2$, $HfO_2$, ZrO, $ZnO_2$, or $Si_3N_4$.

12. The surface-relief grating of claim 1, wherein the second material has a higher refractive index than the first material.

13. The surface-relief grating of claim 1, wherein the layer of the second material is characterized by a variation in thickness less than 10% of an average thickness of the layer of the second material.

14. The surface-relief grating of claim 1, wherein the layer of the second material is conformally deposited on the surfaces of the plurality of grating ridges by atomic layer deposition or plasma enhanced chemical vapor deposition (PECVD).

15. The surface-relief grating of claim 1, wherein the first region of the surface-relief grating is characterized by a grating period less than 200 nm.

* * * * *